United States Patent
Lei et al.

(10) Patent No.: US 11,758,497 B2
(45) Date of Patent: Sep. 12, 2023

(54) TIMING ADVANCE SIMPLIFICATION FOR STATIONARY AND LOW MOBILITY USER EQUIPMENTS

(71) Applicant: QUALCOMM Incorporated, San Diego, CA (US)

(72) Inventors: Jing Lei, San Diego, CA (US); Wanshi Chen, San Diego, CA (US); Huilin Xu, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 210 days.

(21) Appl. No.: 17/127,901

(22) Filed: Dec. 18, 2020

(65) Prior Publication Data
US 2021/0195546 A1    Jun. 24, 2021

Related U.S. Application Data

(60) Provisional application No. 62/953,182, filed on Dec. 23, 2019.

(51) Int. Cl.
*H04W 56/00* (2009.01)
*H04W 74/08* (2009.01)
(Continued)

(52) U.S. Cl.
CPC ... *H04W 56/0045* (2013.01); *H04W 72/0453* (2013.01); *H04W 72/23* (2023.01);
(Continued)

(58) Field of Classification Search
CPC ........... H04W 56/0045; H04W 72/042; H04W 72/0453; H04W 74/0833; H04W 76/11;
(Continued)

(56) References Cited

U.S. PATENT DOCUMENTS

2013/0301541 A1* 11/2013 Mukherjee ........ H04W 74/0833
370/329
2014/0086219 A1* 3/2014 Suzuki ............. H04W 56/0005
370/336
(Continued)

FOREIGN PATENT DOCUMENTS

CN    105188128 A   * 12/2015   .......... H04W 56/004
EP    2367386 A1    9/2011
(Continued)

OTHER PUBLICATIONS

Fu, A Wireless Service and Air Interface Synchronization Method, Base Station, Communication Device and System, Dec. 23, 2015, CN, English translation of CN 105188128 (Year: 2015).*
(Continued)

*Primary Examiner* — Michael K Phillips
(74) *Attorney, Agent, or Firm* — Loza & Loza, LLP

(57) ABSTRACT

A user equipment (UE) in a radio resource connection (RRC) inactive or idle state may initiate a random access procedure with a base station (BS) for initial access to a network, to resume an RRC connection, to re-establish an RRC connection, or to perform an early data transmission to a network. The BS may selectively include a timing advance (TA) medium access control (MAC) control element (CE) and an indication of a simplified timing advance command for the UE. The aspects herein may reduce the signaling overhead of the TA MAC CE. For example, the UE may enter an idle state or an inactive state. The UE may transmit a random access message to the BS with a request for timing advance simplification based, at least in part, on a TA value corresponding to the BS, wherein the TA value is applied to the transmission of the random access message.

26 Claims, 25 Drawing Sheets

(51) Int. Cl.
*H04W 76/27* (2018.01)
*H04W 76/11* (2018.01)
*H04W 80/02* (2009.01)
*H04W 72/0453* (2023.01)
*H04W 76/19* (2018.01)
*H04W 72/23* (2023.01)

(52) U.S. Cl.
CPC ........ *H04W 74/0833* (2013.01); *H04W 76/11* (2018.02); *H04W 76/19* (2018.02); *H04W 76/27* (2018.02); *H04W 80/02* (2013.01)

(58) Field of Classification Search
CPC ..... H04W 76/19; H04W 76/27; H04W 80/02; H04W 72/23
See application file for complete search history.

(56) References Cited

U.S. PATENT DOCUMENTS

| | | | | |
|---|---|---|---|---|
| 2014/0219170 A1* | 8/2014 | Zhao | ........................ | H04W 8/24 370/328 |
| 2015/0223184 A1* | 8/2015 | Bergstrom | ........ | H04W 56/0045 370/329 |
| 2018/0124775 A1* | 5/2018 | Seo | ....................... | H04L 1/1671 |
| 2019/0289660 A1* | 9/2019 | Yi | ........................ | H04W 74/006 |
| 2019/0387548 A1* | 12/2019 | Kim | ....................... | H04W 72/20 |
| 2020/0288503 A1* | 9/2020 | Sahlin | ................... | H04L 5/0053 |
| 2020/0314909 A1* | 10/2020 | Irukulapati | ....... | H04W 74/0833 |
| 2020/0351949 A1* | 11/2020 | Turtinen | ........... | H04W 74/0833 |
| 2020/0413453 A1* | 12/2020 | Shao | ..................... | H04L 5/0082 |
| 2021/0298108 A1* | 9/2021 | Wu | ........................ | H04W 76/27 |
| 2021/0352654 A1* | 11/2021 | Ai | ........................ | H04W 72/23 |
| 2021/0377904 A1* | 12/2021 | Huang | ............. | H04W 56/0045 |
| 2022/0039098 A1* | 2/2022 | Chang | .................... | H04W 4/70 |
| 2022/0167289 A1* | 5/2022 | Amorim | ........... | H04W 56/0045 |
| 2022/0264497 A1* | 8/2022 | Wiacek | ................. | H04W 76/20 |

FOREIGN PATENT DOCUMENTS

| | | | | |
|---|---|---|---|---|
| WO | WO-2013027720 A1 * | 2/2013 | ........ | H04W 56/0045 |
| WO | WO-2013119157 A1 * | 8/2013 | ............ | H04L 5/001 |
| WO | 2013140024 A1 | 9/2013 | | |
| WO | 2018070908 A1 | 4/2018 | | |

OTHER PUBLICATIONS

Uchino et al., "Base station and transmission timing adjustment method", Feb. 28, 2013, WO, WO-2013027720, English translation. (Year: 2013).*

International Search Report and Written Opinion—PCT/US2020/066277—ISA/EPO—dated Mar. 30, 2021.

* cited by examiner

TIMING ADVANCE SIMPLIFICATION FOR STATIONARY AND LOW MOBILITY USER EQUIPMENTS

CROSS REFERENCE TO RELATED APPLICATION

This application claims the benefit of U.S. Provisional Application Ser. No. 62/953,182, entitled "TIMING ADVANCE SIMPLIFICATION FOR STATIONARY AND LOW MOBILITY USER EQUIPMENTS" and filed on Dec. 23, 2019, which is expressly incorporated by reference herein in its entirety.

TECHNICAL FIELD

The technology discussed below relates generally to wireless communication systems, and more particularly, to timing advance simplification for stationary and low mobility user equipments (UEs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

A user equipment (UE) may initiate a random access procedure with a base station (also referred to as a serving base station) for initial access to the network (e.g., to achieve UL synchronization with the base station). The base station may include a 12-bit timing advance (TA) medium access control (MAC) control element (CE) for the UE in a second message of the random access procedure. For example, the second message of the random access procedure may be a message 2 of a four-step random access procedure or a message B of a two-step random access procedure. The base station may transmit the second message of the random access procedure to the UE in a downlink channel (e.g., a physical downlink shared channel (PDSCH)).

For stationary and low-mobility UEs (e.g., a UE implemented as a surveillance camera) supporting single connectivity, the timing advance offset indicated in the 12-bit TA MAC CE may not change frequently. Moreover, these UEs may rarely perform cell re-selection operations. The aspects described herein may simplify timing advance (TA) configuration procedures (i.e., timing advance simplification) for stationary and low-mobility UEs to reduce the signaling overhead of the 12-bit TA MAC CE, and/or to reduce complexities associated with UL synchronization.

In an aspect of the disclosure, a method of wireless communication for a user equipment (UE) is provided. The UE enters an idle state or an inactive state. The UE transmits a random access message to a serving base station with a request for timing advance simplification based, at least in part, on a timing advance value corresponding to the base station, wherein the timing advance value is applied to the transmission of the random access message or a transmission of uplink small data, and wherein the random access message is an initial message of a random access procedure.

In an aspect of the disclosure, a method of wireless communication for a base station is provided. The base station receives a reduced capability report or a random access message including a request for timing advance simplification from a user equipment (UE). The base station generates a random access response message based on the timing advance simplification. The base station transmits the random access response message to the UE.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

In the aspects described herein, the term new radio (NR) generally refers to 5G technologies and the new radio access technology undergoing definition and standardization by 3GPP in Releases 15.

Figure 1:
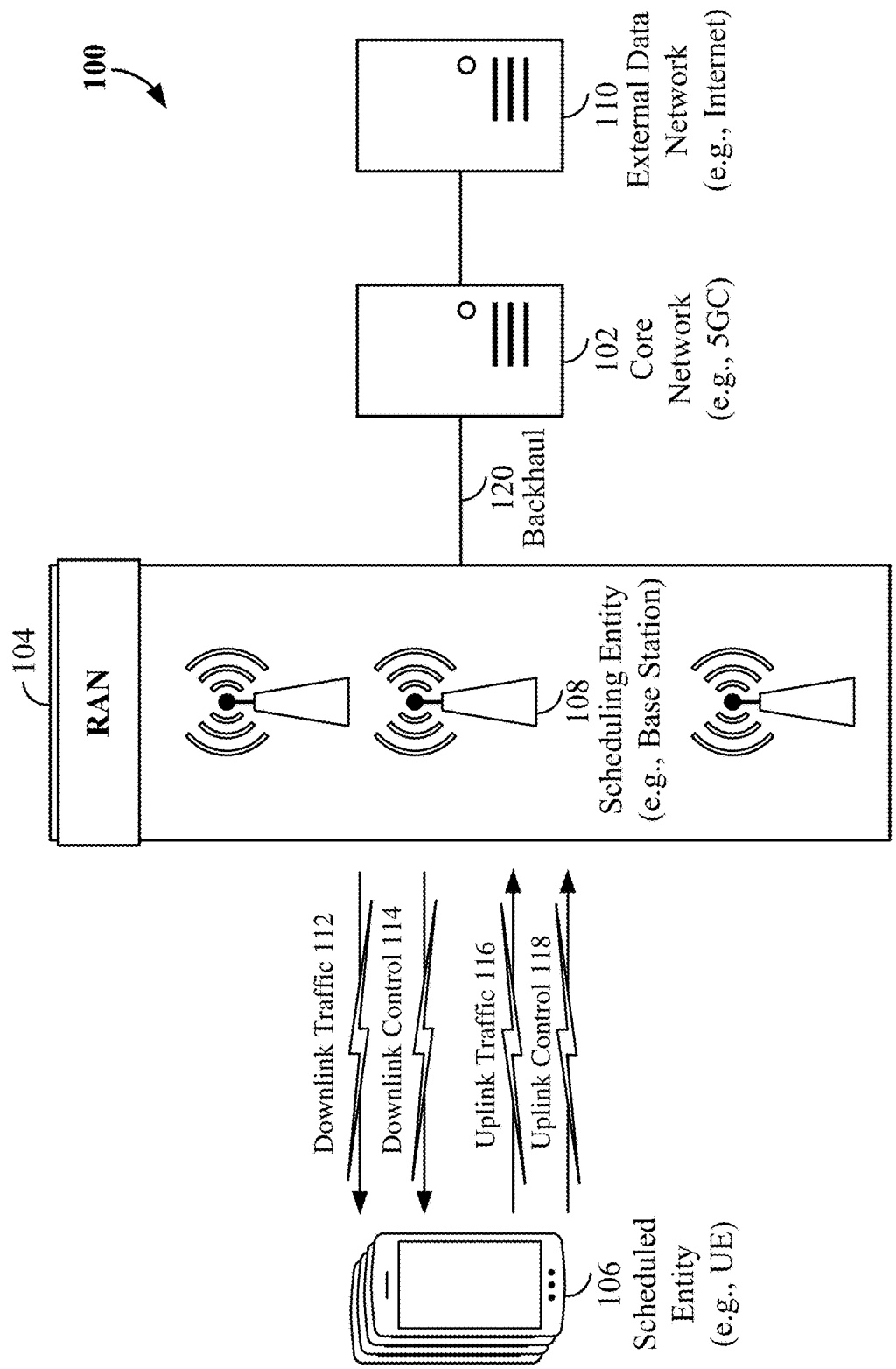
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a base station (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (described further below; e.g., UE 106).

In some examples, access to the air interface may be scheduled, wherein a base station (e.g., a base station 108) allocates resources for communication among some or all devices and equipment within its service area or cell. Within the present disclosure, as discussed further below, the base station may be responsible for scheduling, assigning, reconfiguring, and releasing resources for one or more scheduled entities. That is, for scheduled communication, UEs 106, which may be scheduled entities, may utilize resources allocated by the base station 108.

Base stations 108 are not the only entities that may function as scheduling entities. That is, in some examples, a UE may function as a base station, scheduling resources for one or more UEs.

As illustrated in FIG. 1, a base station 108 may broadcast downlink traffic 112 to one or more scheduled entities 106. Broadly, the base station 108 is a node or device responsible for scheduling traffic in a wireless communication network, including the downlink traffic 112 and, in some examples, uplink traffic 116 from one or more scheduled entities 106 to the base station 108. On the other hand, the UE 106 is a node or device that receives downlink control information 114, including but not limited to scheduling information (e.g., a grant), synchronization or timing information, or other control information from another entity in the wireless communication network such as the base station 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
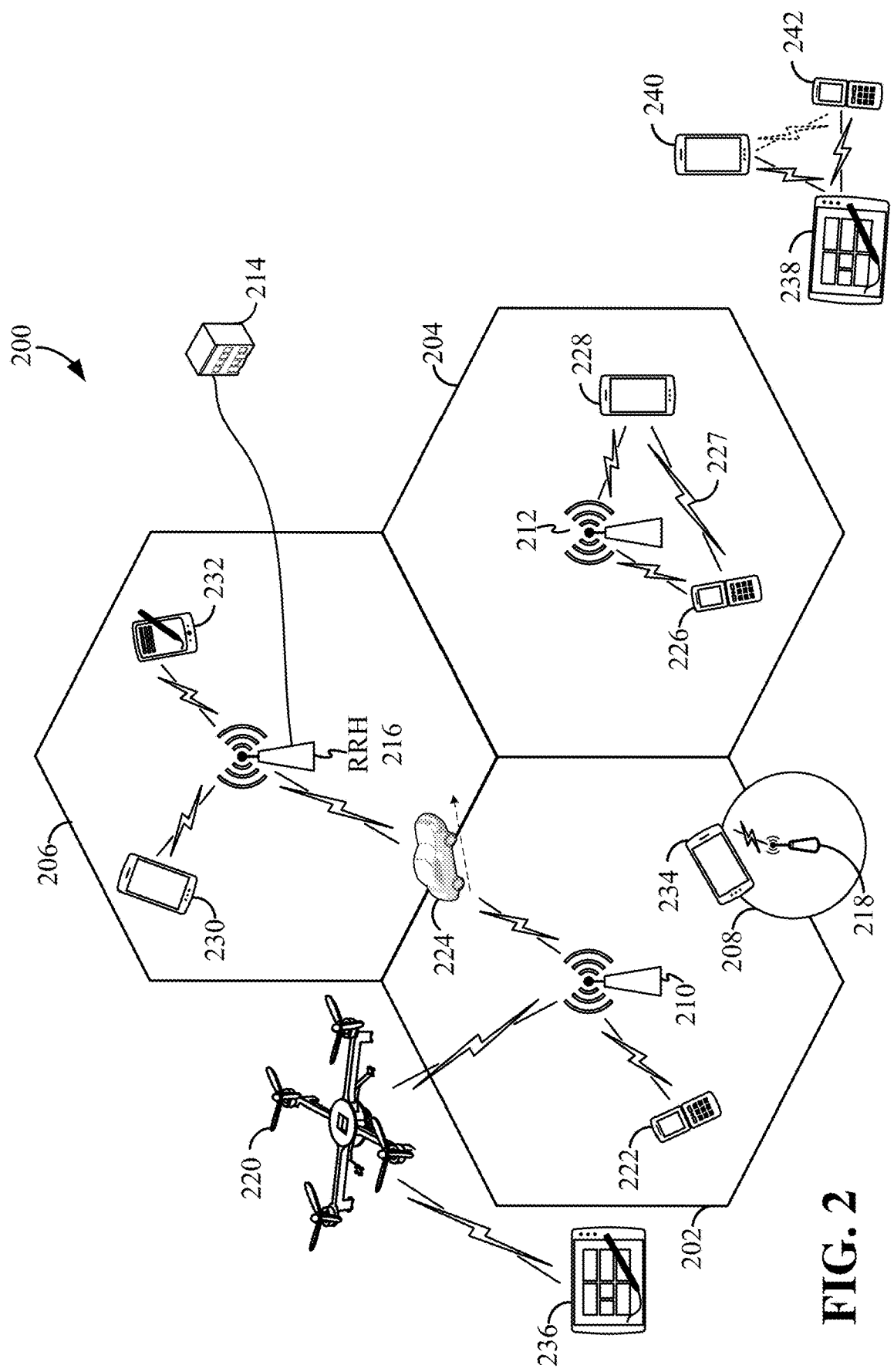
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/base station 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a base station or a primary sidelink device, and UEs 240 and 242 may function as a UE or a non-primary (e.g., secondary) sidelink device. In still another example, a UE may function as a base station in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the base station 238. Thus, in a wireless communication system with scheduled access to time-frequency resources and having a cellular configuration, a P2P configuration, or a mesh configuration, a base station and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a base station, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation (NG) communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
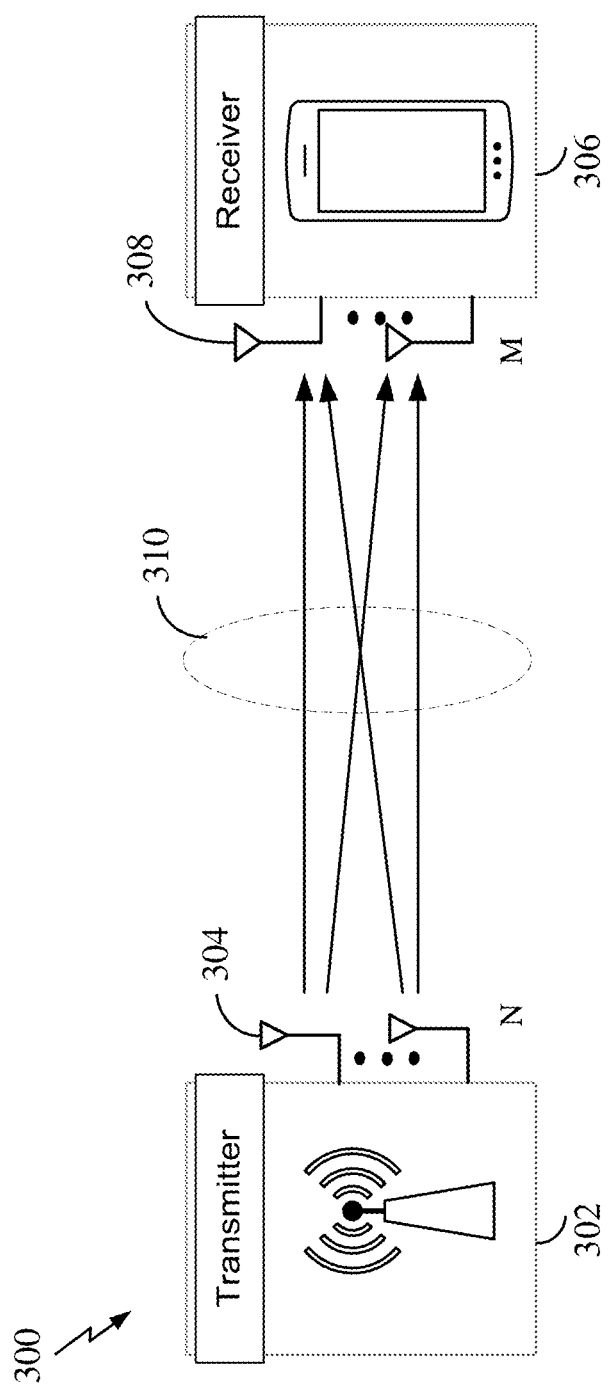
FIG. 3 is a block diagram illustrating a wireless communication system supporting multiple-input multiple-output (MIMO) communication.

In some aspects of the disclosure, the base station and/or UE may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a base station 108, a UE 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe 402 (e.g., a 1 ms subframe) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
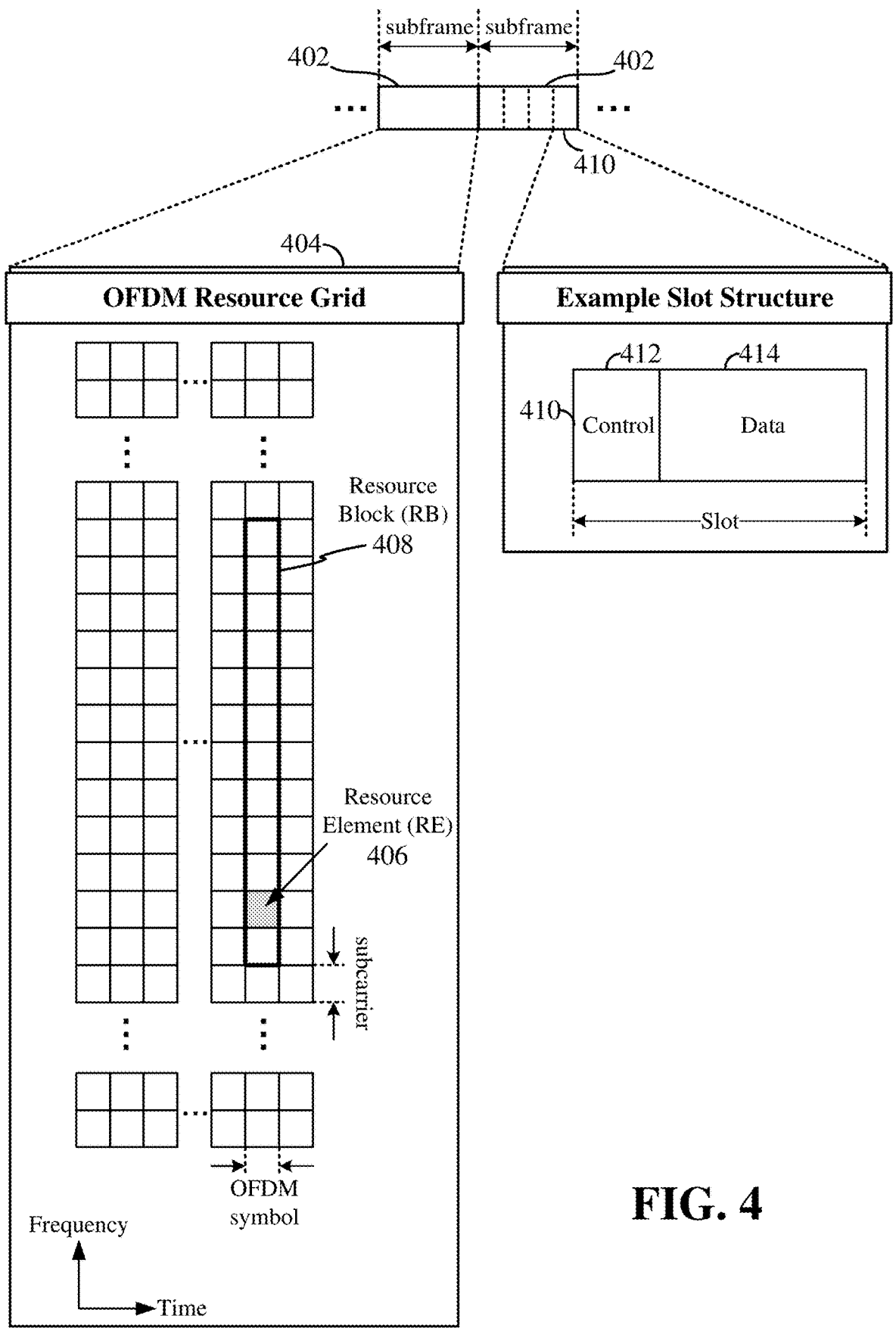
FIG. 4 is a schematic illustration of an organization of wireless resources in an air interface utilizing orthogonal frequency divisional multiplexing (OFDM) according to some embodiments.

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In a DL transmission, the transmitting device (e.g., the base station 108) may allocate one or more REs 406 (e.g., within a control region 412) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block (SSB) that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a UE 106) may utilize one or more REs 406 to carry UL control information 118 (UCI). The UCI can originate from higher layers via one or more UL control channels, such as a physical uplink control channel (PUCCH), a physical random access channel (PRACH), etc., to the base station 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the base station 108 to schedule uplink transmissions. Here, in response to the SR transmitted on the control channel 118, the base station 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 4 are not necessarily all the channels or carriers that may be utilized between a base station 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 5:
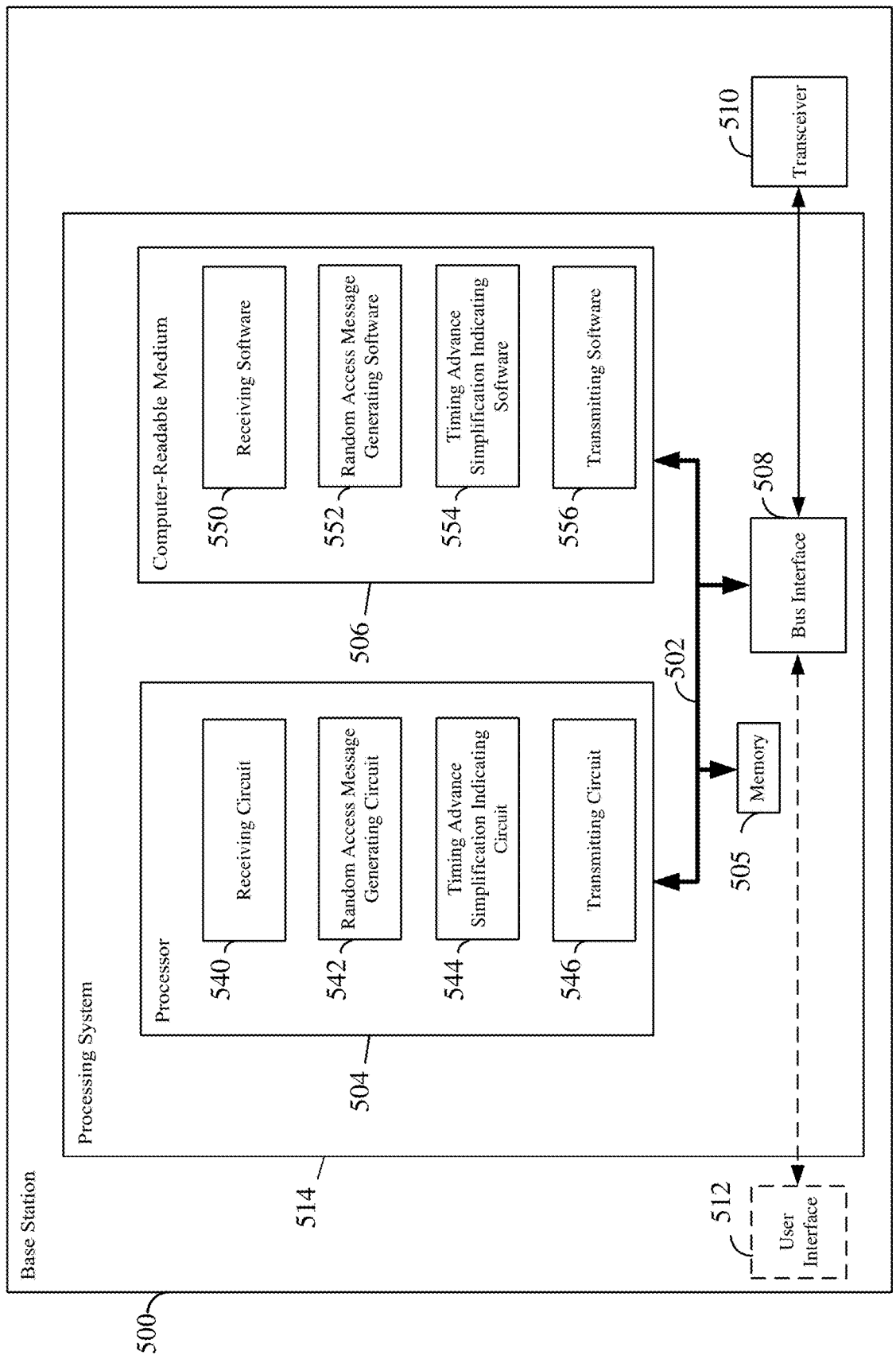
FIG. 5 is a block diagram conceptually illustrating an example of a hardware implementation for a base station according to some aspects of the disclosure.

FIG. 5 is a block diagram illustrating an example of a hardware implementation for a base station 500 employing a processing system 514. For example, the base station 500 may be any one of the base stations illustrated in FIGS. 1, 2, and/or 3.

The base station 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 500 may be configured to perform any one or more of the functions described herein. That is, the processor 504, as utilized in a base station 500, may be used to implement any one or more of the processes and procedures described herein.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a communication interface or means for communicating with various other apparatus over a transmission medium. Depending upon the nature of the apparatus, a user interface 512 (e.g., keypad, display, speaker, microphone, joystick) may also be provided. Of course, such a user interface 512 is optional, and may be omitted in some examples, such as a base station.

In some examples, the processor 504 may include circuitry configured for the various functions described herein. For example, the processor 504 may include receiving circuitry 540 configured to receive a reduced capability report or a random access message including a request for timing advance simplification from a user equipment (UE). In some examples, the processor 504 may include random access message generating circuitry 542 configured to generate a random access response message based on the timing advance simplification. In some examples, the processor 504 may include timing advance simplification indicating circuitry 544 configured to include an indication of the timing advance simplification in a random access response message. In some examples, the processor 504 may include transmitting circuitry 546 configured to transmit the random access response message to the UE.

The processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 506 may include software configured for the various functions described herein. In some examples, the computer-readable storage medium 506 may include receiving software 550 configured to receive a reduced capability report or a random access message including a request for timing advance simplification from a user equipment (UE). In some examples, the computer-readable storage medium 506 may include random access message generating software 552 configured to generate a random access response message based on the timing advance simplification. In some examples, the computer-readable storage medium 506 may include timing advance simplification indicating software 554 configured to include an indication of the timing advance simplification in a random access response message. In some examples, the computer-readable storage medium 506 may include transmitting software 556 configured to transmit the random access response message to the UE.

Figure 6:
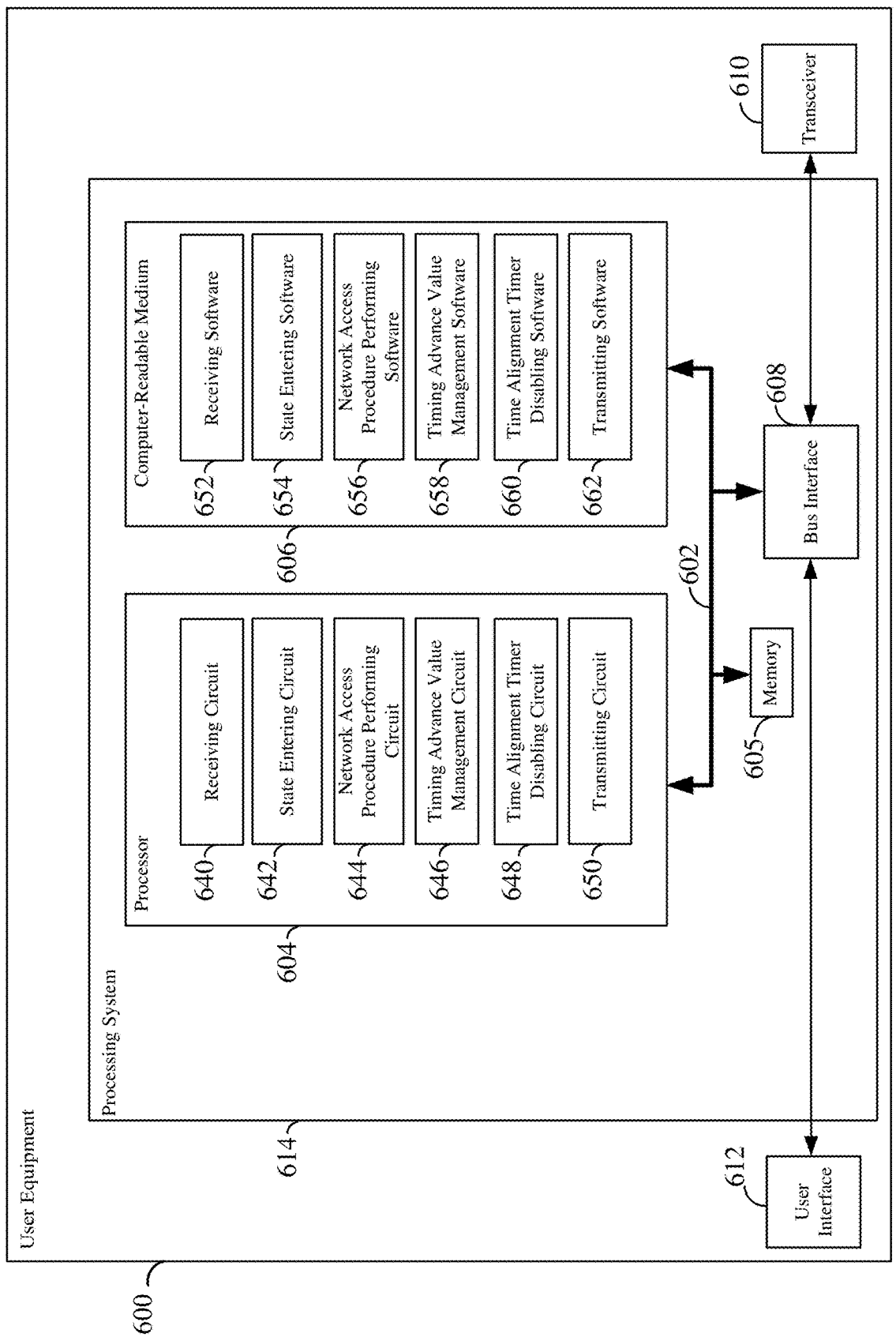
FIG. 6 is a block diagram conceptually illustrating an example of a hardware implementation for a user equipment (UE) according to some aspects of the disclosure.

FIG. 6 is a conceptual diagram illustrating an example of a hardware implementation for an exemplary user equipment (UE) 600 employing a processing system 614. In accordance with various aspects of the disclosure, an element, or any portion of an element, or any combination of elements may be implemented with a processing system 614 that includes one or more processors 604. For example, the UE 600 may be any one of the UEs illustrated in FIGS. 1, 2, and/or 3.

The processing system 614 may be substantially the same as the processing system 514 illustrated in FIG. 5, including a bus interface 608, a bus 602, memory 605, a processor 604, and a computer-readable medium 606. Furthermore, the UE 600 may include a user interface 612 and a transceiver 610 substantially similar to those described above in FIG. 5. That is, the processor 604, as utilized in a UE 600, may be used to implement any one or more of the processes described below and illustrated in FIGS. 12-21.

In some aspects of the disclosure, the processor 604 may include circuitry configured for the various functions described herein. For example, the processor 604 may include receiving circuitry 640 configured to receive a timing advance value for a serving base station while performing the initial network access procedure, receive a timing advance value from the serving base station, receive a random access response message from the serving base station in response to a transmitted random access message, wherein the random access response message is received without a timing advance (TA) media access control (MAC) control element (CE), receive a random access response message from the serving base station in response to a transmitted random access message, wherein the random access response message is received with a timing advance (TA) increment media access control (MAC) control element (CE), receive a random access response message from the serving base station in response to a transmitted random access message, wherein the random access response message includes one or more bits configured to indicate the timing advance simplification, receive a random access response message from the serving base station including a back-off indicator, and/or receive an indication of the timing advance simplification from the serving base station in response to the transmitted random access message.

The processor 604 may further include state entering circuitry 642 configured to enter an idle state of the UE 600 or an inactive state of the UE 600.

The processor 604 may further include network access procedure performing circuitry 644 configured to perform an initial network access procedure with the serving base station to establish a radio resource connection (RRC) with the serving base station. In some aspects of the disclosure, the network access procedure performing circuitry 644 may be configured to perform a contention based random access procedure or a contention free random access procedure with the serving base station if the number of retransmission attempts for the random access message is greater than or equal to the threshold value, wherein the UE transmits a random access message of the contention based random access procedure or the contention free random access procedure without applying the timing advance value and without the request for the timing advance simplification.

The processor 604 may further include timing advance value management circuitry 646 configured to check for a timing advance value for a serving base station, store a timing advance value for a serving base station, maintain a timing advance value for the serving base station, maintain a timing advance value if a number of retransmission attempts for the random access message is less than a threshold value, update a timing advance value for the serving base station based on the timing advance (TA) increment media access control (MAC) control element (CE), and/or update a timing advance value for the serving base station based on the full size timing advance (TA) media access control (MAC) control element (CE).

In some examples, the processor 604 may include time alignment timer disabling circuitry 648 configured to disable a time alignment timer of the UE.

The processor 604 may further include transmitting circuitry 650 configured to transmit a random access message to a serving base station with a request for timing advance simplification based, at least in part, on a timing advance value corresponding to the base station. The random access message may be an initial message of a random access procedure. For example, the transmitting circuitry 650 may apply the timing advance value to the transmission of the random access message or a transmission of uplink small data. The transmitting circuitry 650 may be further configured to transmit a subsequent random access message to the serving base station. For example, the transmitting circuitry 650 may apply the updated timing advance value to the transmission of the subsequent random access message.

In one or more examples, the computer-readable storage medium 606 may include software configured for the various functions described herein. In some examples, the computer-readable storage medium 606 may include receiving software 652 configured to receive a timing advance value for a serving base station while performing the initial network access procedure, receive a timing advance value from the serving base station, receive a random access response message from the serving base station in response to a transmitted random access message, wherein the random access response message is received without a timing advance (TA) media access control (MAC) control element (CE), receive a random access response message from the serving base station in response to a transmitted random access message, wherein the random access response message is received with a timing advance (TA) increment media access control (MAC) control element (CE), receive a random access response message from the serving base station in response to a transmitted random access message, wherein the random access response message includes one or more bits configured to indicate the timing advance simplification, receive a random access response message from the serving base station including a back-off indicator, and/or receive an indication of the timing advance simplification from the serving base station in response to the transmitted random access message.

In some examples, the computer-readable storage medium 606 may include state entering software 654 configured to enter an idle state of the UE 600 or an inactive state of the UE 600.

In some examples, the computer-readable storage medium 606 may include network access procedure performing software 656 configured to perform an initial network access procedure with the serving base station to establish a radio resource connection (RRC) with the serving base station. In some aspects of the disclosure, the network access procedure performing software 656 may be configured to perform a contention based random access procedure or a contention free random access procedure with the serving base station if the number of retransmission attempts for the random access message is greater than or equal to the threshold value, wherein the UE transmits a random access message of the contention based random access procedure or the contention free random access procedure without applying the timing advance value and without the request for the timing advance simplification.

In some examples, the computer-readable storage medium 606 may include timing advance value management software 658 configured to check for a timing advance value for a serving base station, store a timing advance value for a serving base station, maintain a timing advance value for the serving base station, maintain a timing advance value if a number of retransmission attempts for the random access message is less than a threshold value, update a timing advance value for the serving base station based on the timing advance (TA) increment media access control (MAC) control element (CE), and/or update a timing advance value for the serving base station based on the full size timing advance (TA) media access control (MAC) control element (CE).

In some examples, the computer-readable storage medium 606 may include time alignment timer disabling software 660 configured to disable a time alignment timer of the UE.

In some examples, the computer-readable storage medium 606 may include transmitting software 662 configured to transmit a random access message to a serving base station with a request for timing advance simplification based, at least in part, on a timing advance value corresponding to the base station. The random access message may be an initial message of a random access procedure. For example, the transmitting software 662 may apply the timing advance value to the transmission of the random access message or a transmission of uplink small data. The transmitting software 662 may be further configured to transmit a subsequent random access message to the serving base station. For example, the transmitting software 662 may apply the updated timing advance value to the transmission of the subsequent random access message.

Figure 7:
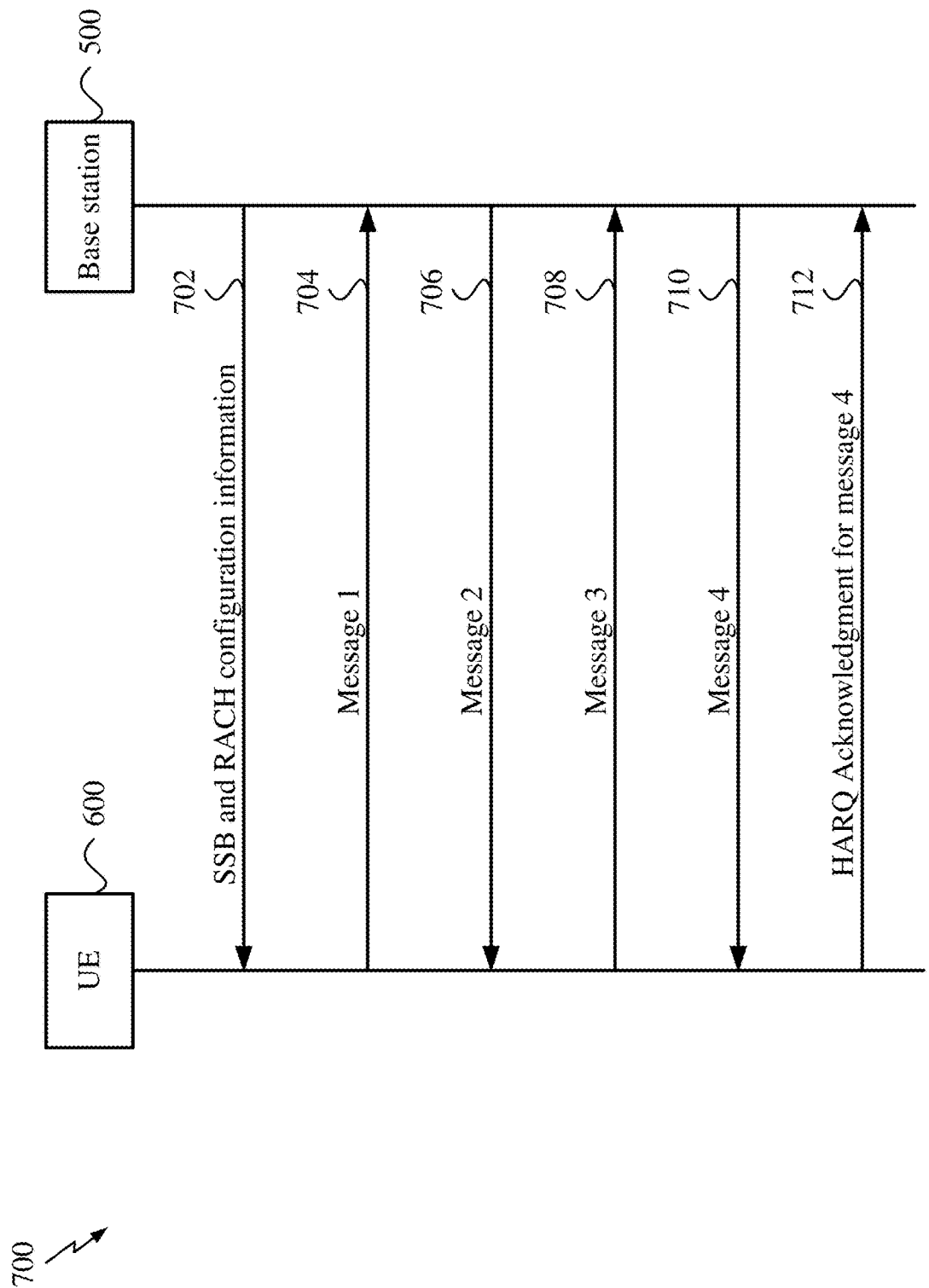
FIG. 7 is a signal flow diagram illustrating an example 4-step random access (RA) procedure performed between a UE and a base station.

FIG. 7 is a signal flow diagram illustrating an example 4-step random access (RA) procedure 700 performed between a UE (e.g., UE 600) and a base station (e.g., base station 500). The 4-step RA procedure 700 may be a contention based random access procedure (CBRA) and may be initiated by the UE 600 for initial access to the network (e.g., to achieve UL synchronization with the base station 500). As shown in FIG. 7, the UE 600 may receive cell detection information 702 from the base station 500. In some aspects of the disclosure, the cell detection information 702 may include an SSB and random access channel (RACH) configuration information.

The UE 600 may initiate the 4-step RA procedure 700 by transmitting a PRACH preamble in message 1 (Msg1) 704. The message 1 (Msg1) 704 may be referred to as a random access message and may be the initial message of the 4-step RA procedure 700. Upon detection of the PRACH preamble, the base station 500 responds with message 2 (Msg2) 706 including a random access response (RAR). The base station 500 may use a PDCCH for scheduling and a PDSCH for transmitting the message 2 706. The RAR may include a UL grant for transmission of message 3 (Msg3) 708 by the UE 600 using a PUSCH. The base station 500 may transmit a contention resolution via the message 4 (Msg4) 710 using the PDCCH for scheduling and the PDSCH for transmitting the message 4 710. The UE 600 may acknowledge the message 4 710 with a HARQ acknowledgement (ACK) message 712 using a PUCCH.

Figure 8:
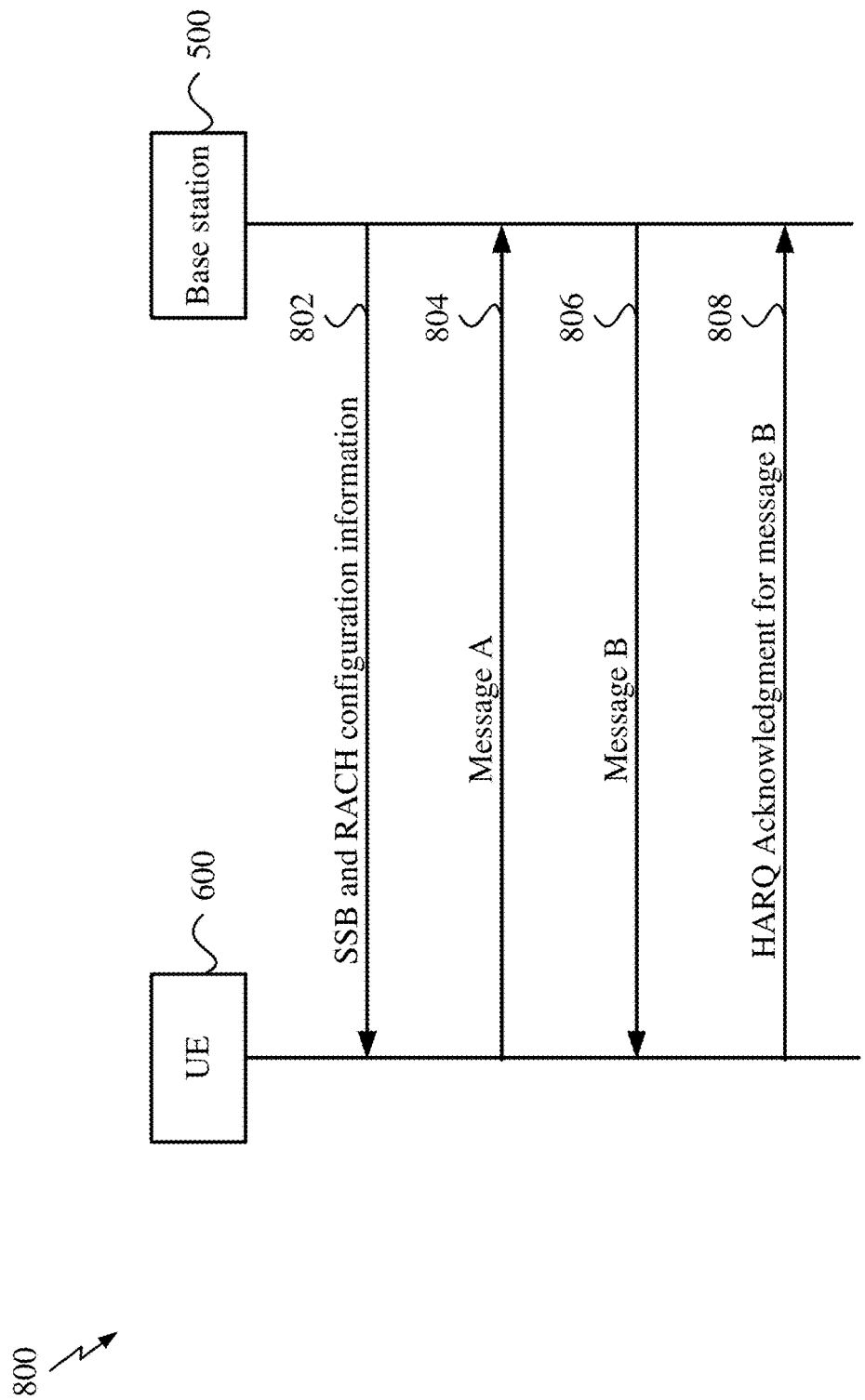
FIG. 8 is a signal flow diagram illustrating an example 2-step random access (RA) procedure performed between a UE and a base station.

FIG. 8 is a signal flow diagram illustrating an example 2-step random access (RA) procedure 800 performed between a UE (e.g., UE 600) and a base station (e.g., base station 500). The 2-step RA procedure 800 may be a contention based random access procedure (CBRA) and may be initiated by the UE 600 for initial access to the network (e.g., to achieve UL synchronization with the base station 500). As shown in FIG. 8, the UE 600 may receive cell detection information 802 from the base station 500. In some aspects of the disclosure, the cell detection information 802 may include an SSB and RACH configuration information.

The UE 600 may initiate the 2-step RA procedure 800 by transmitting a message A (MsgA) 804 to the base station 500. The message A (MsgA) 804 may be referred to as a random access message and may be the initial message of the 2-step RA procedure 800. The message A 804 may include a PRACH preamble and may be transmitted using the PUSCH. The base station 500 responds by transmitting a message B (MsgB) 806, which may include a contention resolution and timing advance information, using the PDCCH for scheduling and the PDSCH for transmitting the message B 806. The UE 600 may acknowledge the message B 806 with a HARQ acknowledgement (ACK) message 808 using PUCCH.

In the 4-step RA procedure 700, if the base station 500 can successfully detect the message 1 704 transmitted by the UE 600, the base station 500 may estimate the UL timing offset of the UE 600 and may transmit a full size (e.g., 12-bit) timing advance (TA) media access control (MAC) control element (CE) in the message 2 706.

In the 2-step RA procedure 800, if the base station 500 can successfully detect the PRACH preamble included in the message A 804 transmitted by the UE 600, the base station 500 may estimate the UL timing offset of the UE 600 and may transmit a 12-bit TA MAC CE in the message B 806 using the PDSCH. If the base station 500 can also successfully decode the payload of the message A 804, the base station 500 may transmit the full size (e.g., 12-bit) TA MAC CE in a success random access response (SuccessRAR) message. For example, the SuccessRAR may be mapped to a MAC Sub-PDU carried in the message B 806 on the PDSCH. If the base station 500 fails to decode the payload of the message A 804, the base station 500 may transmit the full size (e.g., 12-bit) TA MAC CE in a fallback random access response (FallbackRAR) message. For example, the FallbackRAR may be mapped to a MAC Sub-PDU carried in the message B 806 on the PDSCH.

If the base station 500 cannot detect the PRACH preamble in message 1 704 or message A 804, the base station 500 cannot determine which UEs are transmitting and, therefore, cannot estimate their UL timing offsets. The base station 500 may send a back-off indicator (BI) to such UEs, which does not include any timing advance information. The back-off indicator may be mapped to the PDSCH of the message 2 706 or the message B 806. UEs which only receive a back-off indicator may re-transmit the message 1 704 or the message A 804 after the RAR window expires and a random back-off is completed.

Figure 9:
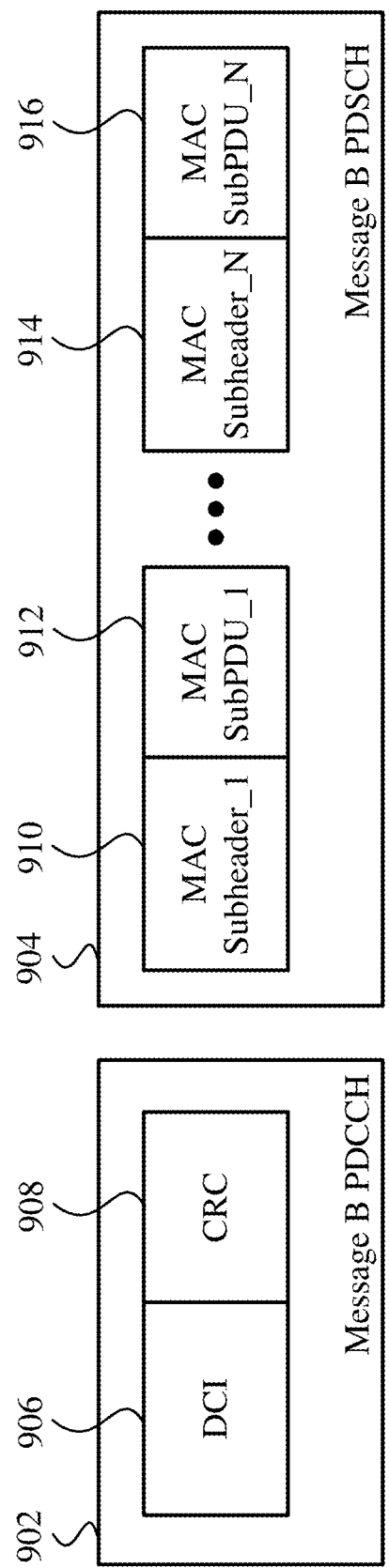
FIG. 9 is a diagram illustrating physical downlink control channel (PDCCH) and physical downlink shared channel (PDSCH) components of an example message B transmission in a 2-step random access (RA) procedure.

FIG. 9 is a diagram illustrating the PDCCH and PDSCH components of an example message B transmission (e.g., the message B 806) in a 2-step random access (RA) procedure. As shown in FIG. 9, a message B PDCCH transmission 902 may include downlink control information (DCI) 906 followed by a cyclic redundancy check (CRC) 908. For example, the CRC 908 may be based on the message B radio network temporary identifier (RNTI) or the message B cell RNTI (C-RNTI). The DCI 906 may schedule the message B PDSCH transmission 904 described below.

As shown in FIG. 9, a message B PDSCH transmission 904 may include one or more MAC subheaders and corresponding MAC sub protocol data units (SubPDUs). For example, the message B PDSCH transmission 904 may include a first MAC subheader (MAC Subheader_1) 910 and a corresponding first MAC SubPDU (SubPDU_1) 912, and an Nth MAC subheader (MAC Subheader_N) 914 and a corresponding Nth MAC SubPDU (SubPDU_N) 916.

Figure 10:
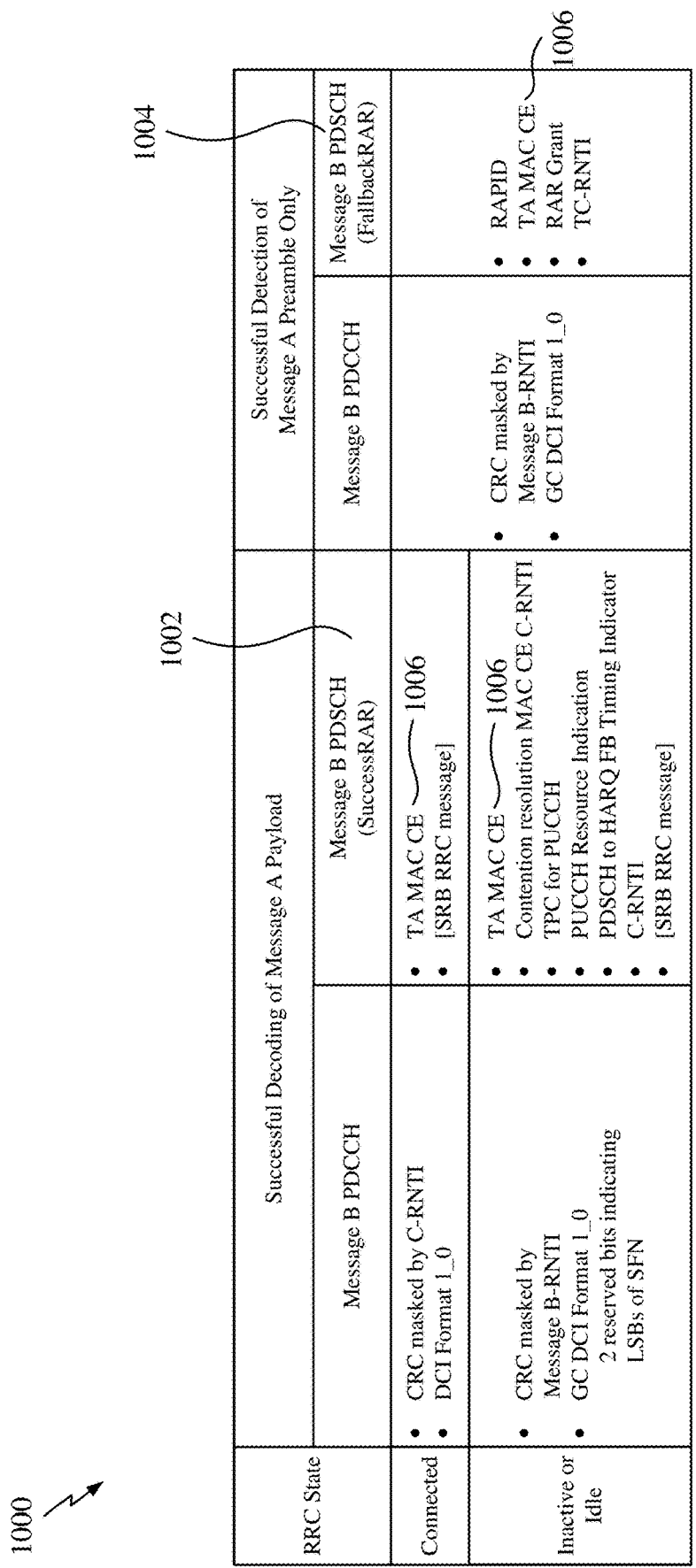
FIG. 10 illustrates a table that describes the contents of a message B of a 2-step random access (RA) procedure.

FIG. 10 illustrates a table 1000 that describes the contents of a message B (e.g., the message B 806) of a 2-step random access (RA) procedure. As shown in table 1000, the contents of a message B random access response (RAR) may depend on the outcome of the processing of a message A at the base station 500 and the radio resource connection (RRC) state of the UE 600.

For UEs sharing the same RACH occasion (RO), different types of RARs may be transmitted. For example, the different types of RARs may include a SuccessRAR 1002, a FallbackRAR 1004, and a Back-off Indicator. In some examples, the base station 500 may aggregate multiple RARs of different UEs in a single message B PDSCH transmission. In some examples, the base station 500 may include a full size (e.g., 12-bit) TA MAC CE 1006 in a FallbackRAR and a SuccessRAR. A UE (e.g., the UE 600) may identify its RAR within a message B PDSCH transmission based on the contents of the MAC Sub-Header and the contents of the MAC Sub-PDU.

Figure 11:
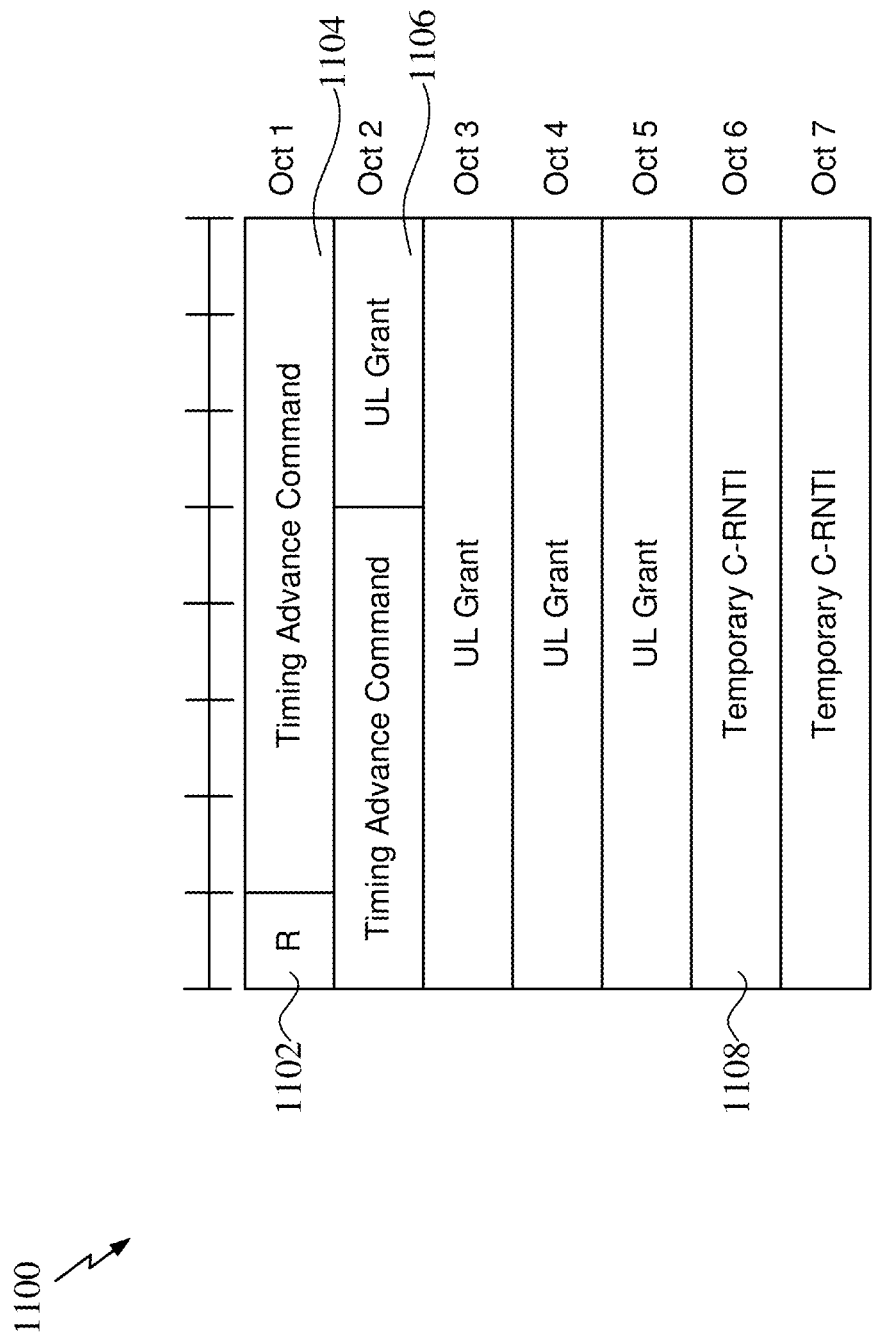
FIG. 11 illustrates an example format of a media access control (MAC) random access response (RAR) 1100 for a message 2 in a 4-step RA procedure.

FIG. 11 illustrates an example format of a media access control (MAC) random access response (RAR) 1100 for a message 2 (e.g., the message 2 706) in a 4-step RA procedure. As shown in FIG. 11, the MAC RAR 1100 may include a single bit (reserved) field 1102, a 12-bit timing advance command field 1104, a 27-bit UL grant field 1106, and a 16-bit temporary C-RNTI field 1108. Timing advance command field 1104 may include a 12-bit TA MAC CE.

Figure 12A:
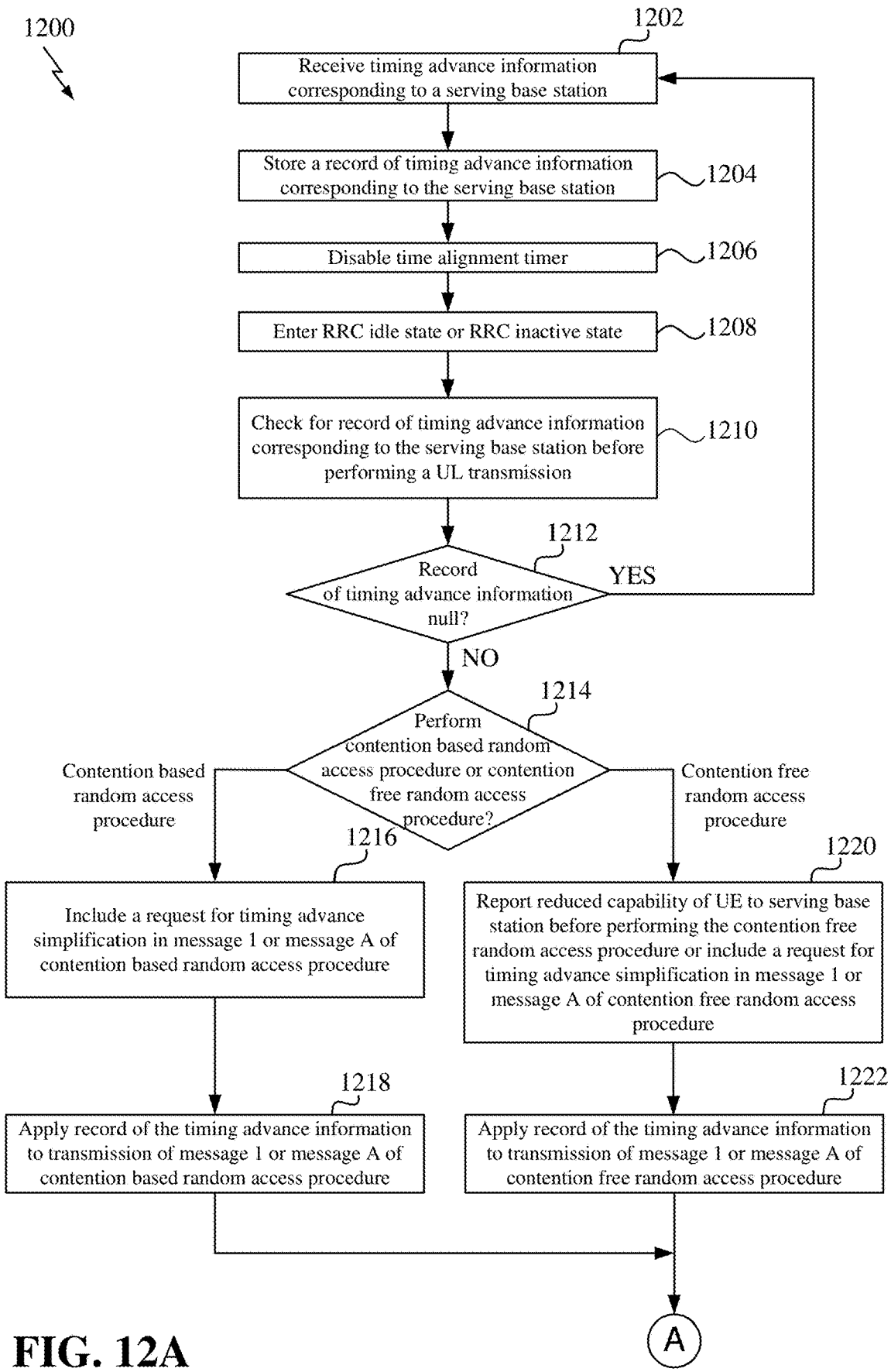
FIG. 12 (including FIGS. 12A, 12B, and 12C) is a flow chart illustrating an exemplary timing advance simplification procedure in accordance with various aspects of the disclosure.
Figure 12B:
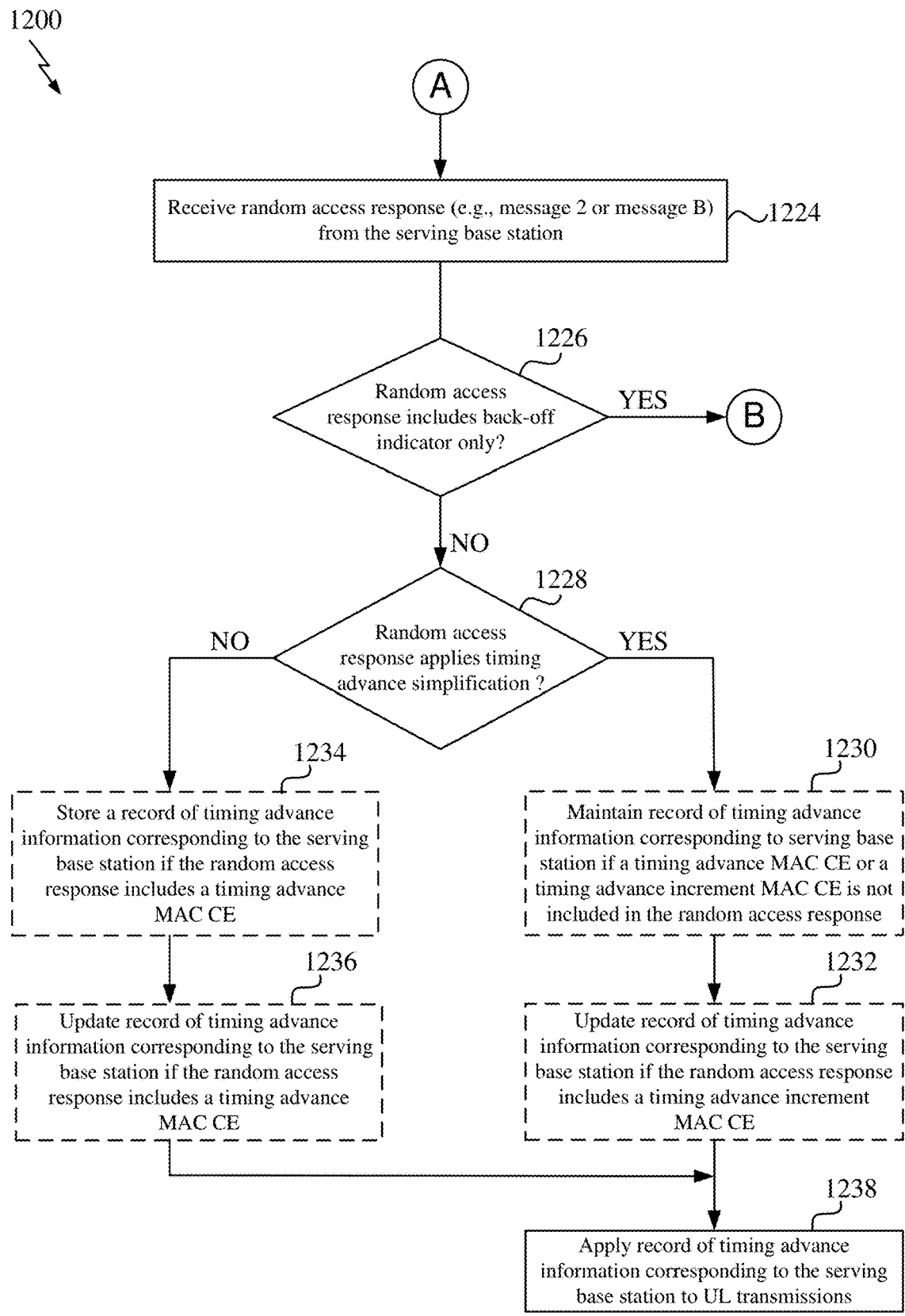
Figure 12C:
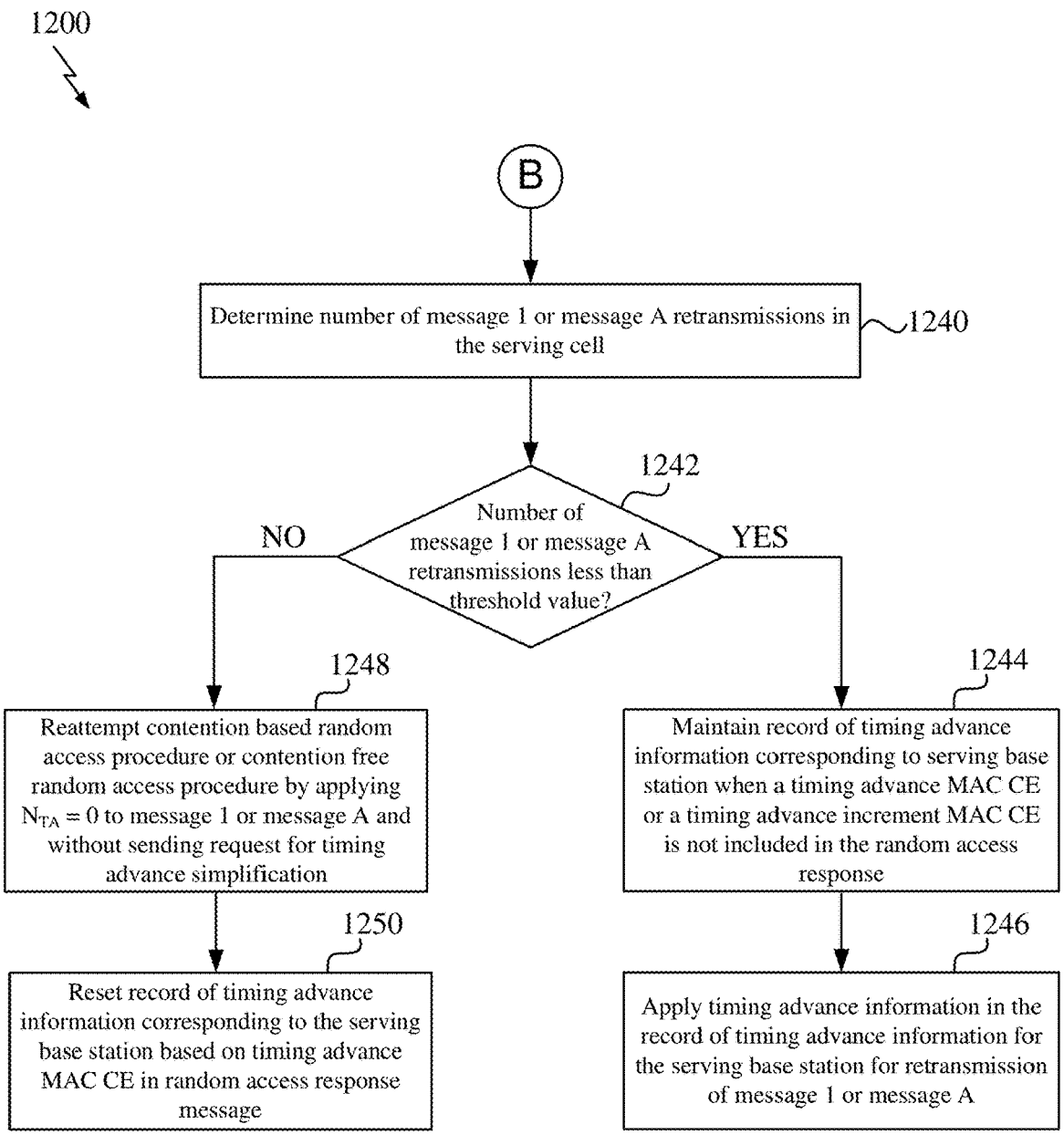

FIG. 12 (including FIGS. 12A, 12B, and 12C) is a flow chart illustrating an exemplary timing advance simplification procedure 1200 in accordance with various aspects of the disclosure. In FIG. 12, operations indicated with dashed lines represent optional operations. Timing advance simplification procedure 1200 may reduce the signaling overhead of the full size (12-bit) TA MAC CE for 4-step and 2-step random access procedures. Timing advance simplification procedure 1200 may also facilitate UL synchronization for UE with or without an RRC connection.

As described below, some or all illustrated features may be omitted in a particular implementation within the scope of the present disclosure, and some illustrated features may not be required for implementation of all embodiments. In some examples, the procedure 1200 may be carried out by a substantially stationary UE or a low mobility UE (e.g., a UE implemented as a surveillance camera, a traffic light, etc.), such as the UE 600 in FIG. 6. The terms "substantially stationary" and "low mobility" as used herein with reference to a UE means that the UE does not have sufficient mobility to cause a change in a timing advance offset provided by a serving base station.

For substantially stationary and/or low mobility UEs supporting single connectivity, the variation of a timing advance offset may be limited and the re-selection of serving cell may occur with a low probability. In some aspects of the disclosure, a substantially stationary UE or a low mobility UE may have reduced capabilities, such as a reduced bandwidth, a reduced number of transmit/receive antennas, half-duplex FDD, a power class reduction, and/or a relaxed processing timeline/capability. In some examples, the procedure 1200 may be carried out by any suitable apparatus or means for carrying out the functions or algorithm described below.

At 1202, a UE (e.g., the UE 600) may receive timing advance (TA) information corresponding to a serving base station (e.g., the base station 500, also referred to as the serving base station 500). The UE may receive the timing advance information from the serving base station during an initial network access process. For example, such initial network access process may be a 4-step random access procedure (e.g., the 4-step random access procedure 700 in FIG. 7) or a 2-step random access procedure (e.g., the 2-step random access procedure 800 in FIG. 8) performed with the serving base station. In the case of the 4-step random access procedure, for example, the UE may receive the timing advance information from the serving base station in the form of a full size (e.g., 12-bit) TA MAC CE included in the message 2 of the 4-step random access procedure. In the case of the 2-step random access procedure, for example, the UE may receive the timing advance information from the serving base station in the form of a full size (e.g., 12-bit) TA MAC CE included in the message B of the 2-step random access procedure.

At 1204, the UE may store a record of the timing advance information corresponding to the serving base station. This record is also herein referred to as a record of a timing advance value or a TA record. In some aspects of the disclosure, the record of the timing advance information may include at least information that identifies the serving base station (e.g., a cell identifier (ID) or an antenna panel identifier (ID) corresponding to the serving base station), a subcarrier spacing (SCS) (e.g., a granularity) of an initial uplink bandwidth part (BWP), and a value (e.g., an integer) representing an amount of the timing advance (also referred to as a timing advance value). In some aspects of the disclosure, the record of the timing advance information stored at a UE for the serving base station may be based on the latest successful completion of a random access procedure. In some aspects, the antenna panel identifier (ID) may be associated with an antenna panel of a multiple transmission and reception point (multi-TRP).

At 1206, the UE may disable a time alignment timer. The time alignment timer may be a timer at the UE indicating a period of time for which the UE may assume a cell to be uplink time aligned. In some examples, the value of the time alignment timer may be RRC configured. In some aspects of the disclosure, the UE may disable the time alignment timer by setting the time alignment timer to infinity.

At 1208, the UE may enter an RRC idle state or an RRC inactive state. In the RRC idle state, the NG-RAN may not maintain a UE context (e.g., parameters necessary for communication between the UE and the network) and the UE may not be registered to a specific cell. When the UE is in the RRC idle state, the network may consider the UE to be in sleep mode and may not transfer data to the UE. The UE may periodically wake up to receive paging messages from the network and the mobility is managed by the UE through cell selection.

The RRC inactive state may be considered to be a primary sleeping state for the UE prior to transition to the RRC idle state in order to save power and to allow fast connection setup. In some examples, the RRC inactive state is a state where the UE remains in a connection management (CM) connected state (also referred to as a CM-Connected state) while roaming within an area (e.g., a RAN-based notification area (RNA)) configured by the NG-RAN without notifying the NG-RAN. The last serving base station may maintain the UE context and the UE-associated NG connection with the serving AMF and user-plane function (UPF).

When the UE needs to perform a UL transmission (e.g., a UL data transmission, or a UL transmission needed for an attempt to resume an RRC connection or to re-establish an RRC connection) after entering the RRC idle state or RRC inactive state, the UE may check for a record (e.g., a TA record) of any timing advance information corresponding to the serving base station before performing the UL transmission as shown in 1210. In one example, the record of the timing advance information may include at least a cell ID or an antenna panel ID corresponding to the serving base station, a subcarrier spacing of an initial uplink bandwidth part (BWP), and the timing advance value (also referred to as a timing advance offset). Accordingly, in this example, the UE may check for the record of the timing advance information corresponding to the serving base station by determining the cell ID or antenna panel ID of the serving base station and searching for the record of the timing advance information that includes the determined cell ID or antenna panel ID.

If the record of the timing advance information for the serving base station is null 1212 (e.g., meaning that no record of the timing advance information including a timing advance value exists for the serving base station), the UE may need to initialize the record of the timing advance information by obtaining a full-size (12-bit) timing advance MAC CE (e.g., at 1202, 1204). In this case, the UE may not request for timing advance simplification. If the record of the timing advance information for the serving base station is not null 1212, the UE may determine whether to perform a contention based random access procedure or a contention free random access procedure with the serving base station 1214. In the case of the contention based random access procedure, at 1216, the UE may trigger timing advance simplification by including a request for timing advance simplification in message 1 or message A of the contention based random access procedure 1216.

Timing advance simplification refers to a reduction in the signaling overhead of the TA MAC CE (e.g., a 12-bit TA MAC CE), and/or complexity reduction for UL synchronization. In some examples, when a UE implements timing advance simplification, the UE may avoid the need to receive and process the full-size (e.g., 12-bit) TA MAC CE carrying the timing advance value for a base station. In other examples, when a UE implements timing advance simplification, the UE may receive and process fewer than the 12-bits typically included in the full size TA MAC CE to obtain a timing advance value for a base station.

At 1218, the UE may then apply the record of the timing advance information to the transmission of message 1 or message A of the contention based random access procedure. Therefore, in one example scenario, the UE may apply the record of the timing advance information to the transmission of message 1 or message A by applying the original timing advance value (e.g., obtained at 1202) for the base station to the transmission of message 1 or message A.

In the case of the contention free random access procedure, at 1220, the UE may trigger timing advance simplification by either reporting its reduced capability (and its availability of a record of the timing advance information for the serving base station) to the serving base station or by including a request for timing advance simplification in message 1 or message A of the contention free procedure. At 1222, the UE may then apply the record of the timing advance information to the transmission of message 1 or message A of the contention free random access procedure. Therefore, in one example scenario, the UE may apply the record of the timing advance information to the transmission of message 1 or message A by applying the original timing advance value (e.g., obtained at 1202) for the base station to the transmission of message 1 or message A. In some aspects of the disclosure, the record of the timing advance information for the serving base station may be used for UL transmissions for the contention based random access procedure and contention free random access procedure.

In response to the message 1 or message A transmitted from the UE (e.g., the message 1 or message A transmitted at 1218 or 1222) to the serving base station, the UE may receive a random access response (RAR) (also referred to as an RAR message) from the serving base station as shown in 1224. For example, the RAR message may be a message 2 or message B of a random access procedure. If the RAR message does not include a back-off indicator only 1226, the UE may determine whether the RAR message applies timing advance simplification (e.g., timing advance signaling overhead reduction) 1228. In some aspects of the disclosure, and as described in detail herein, the serving base station may use a 1-bit or 2-bit RAR message format indicator to indicate the timing advance simplification to the UE.

In one example scenario, the serving base station may apply timing advance simplification by transmitting the RAR message without a timing advance MAC CE (also referred to as a TA MAC CE). For example, the serving base station may transmit the RAR message without a timing advance MAC CE when the serving base station determines that the record of the timing advance information stored at the UE for the serving base station is valid and does not require a correction or update. The base station may determine that the record of the timing advance information stored at the UE for the serving base station is valid when a message of a random access procedure transmitted from the UE (e.g., a message 1 or a message A transmitted from the UE based on a timing advance offset in the record of the timing advance information) has arrived time aligned at the base station.

In another example scenario, the serving base station may apply timing advance simplification by transmitting the RAR message with a timing advance increment MAC CE (also referred to as a TA increment MAC CE). For example, the serving base station may transmit the RAR message with a timing advance increment MAC CE when the serving base station determines that the record of the timing advance information stored at the UE for the serving base station needs to be updated by a delta value ($\Delta$), where $-2^{N-1}<\Delta<2^{N-1}$. For example, the delta value ($\Delta$) may be a UL timing offset determined by the base station for a message of a random access procedure transmitted from the UE (e.g., a UL timing offset for message 1 or a message A transmitted from the UE as previously described in FIGS. 7 and 8). For example, the UE may update a record of a timing advance value for a serving base station by increasing an existing timing advance value stored in a memory (e.g., memory 605) by the delta value ($\Delta$) in the TA increment MAC CE. The UE may then store the result in the record of the timing advance value for the serving base station.

In one example implementation, the size of the timing advance increment MAC CE may be N bits, where $0 \leq N < 12$. In some aspects of the disclosure, the value of N may be hard-coded in a specification (e.g., a mobile communications specification) implemented by the UE, configured by network as an RRC parameter for a message 2 in a 4-step random access procedure or a message B in a 2-step random access procedure, or indicated to the UE through dynamic signaling. For example, to indicate the value of N to the UE through dynamic signaling, the serving base station may re-purpose the reserved/un-used fields of DCI for message 2 or message B.

In one example implementation, the first bit of the N-bit timing advance increment MAC CE may represent a sign of the timing advance increment. For example, a bit value 0 may be used in the first bit to indicate a positive increment (e.g., an increase in the timing advance value) and a bit value 1 may be used in the first bit to indicate a negative increment (e.g., a decrease in the timing advance value). The second to Nth bits of the N-bit timing advance increment MAC CE may be used to indicate the absolute value of the timing advance increment. For example, the absolute value of the timing advance increment may be a binary representation of the delta value ($\Delta$). In some aspects of the disclosure, if the second to Nth bits of the N-bit timing advance increment MAC CE are all 0s, the RAR message may be considered an RAR message without a timing advance MAC CE.

As previously mentioned, in some aspects of the disclosure, the serving base station may use a 1-bit or 2-bit RAR message format indicator to indicate the timing advance simplification to the UE. In one example implementation, when the 1-bit RAR message format indicator is used, a single bit (e.g., a bit $B_1$) in the DCI, the MAC header, or the MAC subheader may indicate whether the RAR message applies timing advance simplification. For example, $B_1$ may be set to 0 to indicate that the RAR message applies timing advance simplification. Therefore, in this example, $B_1$ may be set to 0 to indicate that the RAR message does not include a timing advance MAC CE or to indicate that the RAR message includes a timing advance increment MAC CE. For example, $B_1$ may be set to 1 to indicate that the RAR message does not apply timing advance simplification.

Therefore, in this example, $B_1$ may be set to 1 to indicate that the RAR message includes a full size (e.g., 12-bit) TA MAC CE.

In another example implementation, when the 2-bit RAR message format indicator is used, two bits (e.g., bits $B_1$ and $B_2$ forming a two-bit word '$B_1B_2$') in the DCI, the MAC header, or the MAC subheader may indicate whether the RAR message applies timing advance simplification. For example, $B_1$ and $B_2$ may both be set to 0 to indicate that the RAR message applies timing advance simplification. Therefore, in this example, $B_1$ and $B_2$ may both be set to 0 to indicate that the RAR message does not include a timing advance MAC CE. For example, $B_1$ may be set to 1 and $B_2$ may be set to 0 to indicate that the RAR message applies timing advance simplification. Therefore, in this example, $B_1$ may be set to 1 and $B_2$ may be set to 0 to indicate that the RAR message includes an N-bit timing advance increment MAC CE. For example, $B_1$ and $B_2$ may both be set to 1 to indicate that the RAR message does not apply timing advance simplification. Therefore, in this example, $B_1$ and $B_2$ may both be set to 1 to indicate that the RAR message includes a full size (e.g., 12-bit) timing advance MAC CE. In some aspects of the disclosure, a configuration where $B_1$ is set to 0 and $B_2$ is set to 1 may be reserved.

Therefore, with reference to FIG. 12B, if the random access response (e.g., the RAR message) applies timing advance simplification 1228, the UE may maintain or update the record of the timing advance information for the serving base station. In the aspects described herein, the term "maintain", as used with respect to a record of timing advance information, means to preserve an existing record of the timing advance information such that the record of the timing advance information (e.g., including the timing advance value) is not reset, changed, and/or deleted. For example, at 1230, the UE may maintain the record of the timing advance information corresponding to serving base station if a timing advance MAC CE (e.g., a full-size timing advance MAC CE) or a timing advance increment MAC CE is not included in the random access response message. As another example, at 1232, the UE may update the record of the timing advance information corresponding to the serving base station if the random access response message includes a timing advance increment MAC CE.

However, if the random access response message (e.g., the RAR message) does not apply timing advance simplification 1228, the UE may store or update a record of timing advance information corresponding to the serving base station based on the timing advance information included in the random access response message. For example, at 1234, the UE may store a record of timing advance information corresponding to the serving base station if the random access response message includes a timing advance MAC CE. In some aspects of the disclosure, the UE may reset its record of the timing advance information for the serving base station based on the timing advance MAC CE received in the random access response message. As another example, at 1236, the UE may update a record of the timing advance information corresponding to the serving base station if the random access response message includes a timing advance MAC CE (e.g., a full-size timing advance MAC CE, such as a 12-bit timing advance MAC CE).

At 1238, the UE may apply the record of the timing advance information corresponding to the serving base station to UL transmissions. For example, the UL transmissions may include UL data transmissions immediately following a message 1 transmission or a message A transmission. Therefore, in one example scenario, the UE may apply the original timing advance information for the serving base station (e.g., a timing advance value in the timing advance information obtained at 1202), which the UE maintains in a record of the timing advance information corresponding to the serving base station (e.g., at 1230), when the random access response message applies timing advance simplification and is transmitted without a timing advance MAC CE. In another example scenario, the UE may apply updated timing advance information for the serving base station (e.g., a timing advance value in the timing advance information obtained at 1202 and updated at 1232), which the UE maintains in a record of the timing advance information corresponding to the serving base station, when the random access response message applies timing advance simplification and is transmitted with a timing advance increment MAC CE.

With reference to the decision operation 1226 in FIG. 12B, if the RAR message includes a back-off indicator only, the UE may proceed to determine the number of message 1 or message A retransmissions in the serving cell as shown in 1240 of FIG. 12C. In one example implementation, the UE may include a counter that maintains a count of the number of message 1 and/or message A retransmissions in the serving cell. The UE may then determine whether the number of message 1 or message A retransmissions is less than a threshold value. For example, the UE may compare the counter to a network configured threshold value (e.g., also referred to as MaxNumber_reTX_recordTA). If the number of message 1 or message A retransmissions (also referred to as re-attempted message 1 or message B transmissions) is less than the threshold value 1242, the UE at 1244 maintains the record of timing advance information corresponding to the serving base station when a timing advance MAC CE or a timing advance increment MAC CE is not included in the random access response message. In other words, the record of timing advance information for the serving base station is not changed. Then at 1246, the UE may apply the timing advance information in the record of timing advance information for the serving base station for retransmission of message 1 or message A.

However, if the number of message 1 or message A retransmissions is greater than or equal to the threshold value 1242, the UE at 1248 may reattempt a contention based random access procedure or a contention free random access procedure without applying any timing advance (e.g., $N_{TA}=0$) to message 1 or message A and without sending a request for timing advance simplification. At 1250, the UE may reset the record of timing advance information corresponding to the serving base station based on a timing advance MAC CE obtained in a random access response message. For example, the random access response message may be a message 2 or message B of the contention based random access procedure or the contention free random access procedure performed in 1248.

Figure 13:
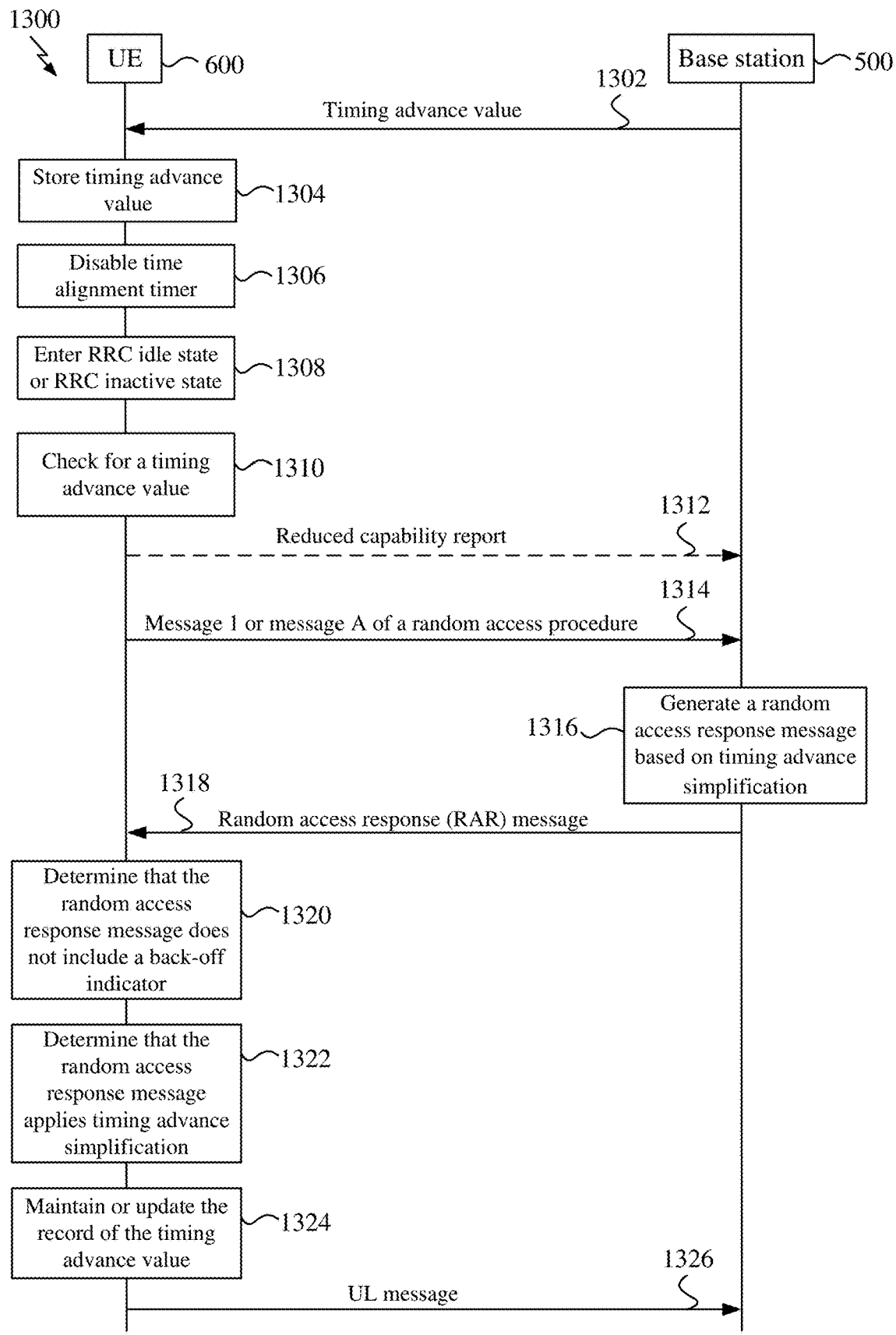
FIG. 13 is a signal flow diagram illustrating an example implementation of timing advance simplification in accordance with various aspects of the disclosure.

FIG. 13 is a signal flow diagram 1300 illustrating an example implementation of timing advance simplification in accordance with various aspects of the disclosure. At 1302, the serving base station 500 may transmit a message 1302 including a timing advance value corresponding to the serving base station 500. The UE 600 may receive the message 1302 including the timing advance value and, at 1304, the UE 600 may store the timing advance value. In some examples, the message 1302 may be a second message (e.g., message 2) of a 4-step random access procedure (e.g., the 4-step random access procedure 700 in FIG. 7) or a second message (e.g., message B) of a 2-step random access procedure (e.g., the 2-step random access procedure 800 in FIG. 8) performed with the serving base station 500. The message 1302 may include a full size (e.g., 12-bit) TA MAC CE that indicates a timing advance value.

At 1306, the UE 600 may disable a time alignment timer. In some aspects of the disclosure, the UE 600 may disable the time alignment timer by setting the time alignment timer to infinity.

At 1308, the UE 600 may enter an RRC idle state or an RRC inactive state. As previously described, the UE 600 may be considered to be in a sleep mode when in the RRC idle state or the RRC inactive state. When the UE 600 needs to perform a UL transmission (e.g., a UL data transmission, or a UL transmission needed for an attempt to resume an RRC connection or to re-establish an RRC connection) after entering the RRC idle state or RRC inactive state, then at 1310, the UE 600 may check for a timing advance value corresponding to the serving base station 500 before performing the UL transmission. In one example, the timing advance value may be associated with at least a cell ID corresponding to the serving base station 500 or an antenna panel ID corresponding to the serving base station 500, and a subcarrier spacing of an initial uplink bandwidth part (BWP). Accordingly, in one example, the UE 600 may check for a timing advance value corresponding to the serving base station 500 by determining the cell ID or antenna panel ID of the serving base station 500 and searching for a timing advance value that is associated with the determined cell ID or antenna panel ID.

If the UE 600 determines the timing advance value for the serving base station 500, the UE 600 may trigger timing advance simplification before or during a random access procedure with the serving base station 500. In some aspects of the disclosure, if the UE 600 is to perform a contention free random access procedure, the UE may trigger timing advance simplification by transmitting either a message 1312 to the serving base station 500 that reports one or more reduced capabilities (also referred to as a reduced capability report) of the UE 600 or a message 1314 configured as the first message (e.g., message 1 or message A) of the contention free random access procedure including a request for timing advance simplification. In some aspects of the disclosure, the message 1312 may serve as an indication to the serving base station 500 that the UE 600 has a timing advance value for the serving base station 500. The UE 600 may apply the determined timing advance value corresponding to the serving base station 500 to the transmission of message 1312 or message 1314. For example, the UE 600 may apply the timing advance value by offsetting the timing of the transmission of message 1312 or message 1314 based on the timing advance value.

In some aspects of the disclosure, if the UE 600 is to perform a contention based random access procedure, the UE 600 may trigger timing advance simplification by transmitting the message 1314 configured as the first message (e.g., message 1 or message A) of the contention based random access procedure including a request for timing advance simplification. The UE 600 may apply the timing advance value in the record of the timing advance value corresponding to the serving base station 500 to the transmission of message 1314. It should be understood that the UE 600 may not transmit the message 1312 if the UE 600 is to perform a contention based random access procedure.

At 1316, if the serving base station 500 receives the message 1312 or detects a request for timing advance simplification in the message 1314, the serving base station 500 may generate a random access response message (e.g., the random access response message 1318) based on the timing advance simplification. For example, the random access response message 1318 may be a message 2 or message B of a random access procedure.

In some aspects of the disclosure, the random access response message based on the timing advance simplification may have reduced signaling overhead. In one example, the serving base station 500 may generate the random access response message without a timing advance MAC CE (also referred to as a TA MAC CE), such as a 12-bit TA MAC CE, if the message 1314 arrives at the base station 500 time aligned. In another example, the serving base station 500 may generate the random access response message with a timing advance increment MAC CE (also referred to as a TA increment MAC CE) if the message 1314 does not arrive at the base station 500 time aligned. For example, the serving base station 500 may generate the random access response message with a timing advance increment MAC CE when the serving base station 500 determines that the timing advance value stored at the UE 600 for the serving base station 500 needs to be updated by a delta value ($\Delta$), where $-2^{N-1}<\Delta<2^{N-1}$ as previously described. For example, the delta value ($\Delta$) may be a timing offset determined by the serving base station 500 for a message (e.g., message 1314) of a random access procedure transmitted from the UE 600. In some aspects of the disclosure, the serving base station 500 may use the previously described 1-bit or 2-bit random access response message format to indicate the timing advance simplification to the UE 600.

The UE 600 may receive the random access response message 1318 from the serving base station 500 and at 1320, the UE 600 may determine that the random access response message 1318 does not include a back-off indicator. At 1322, the UE 600 may determine that the random access response message applies timing advance simplification. In one example implementation, if the 1-bit message format indicator is used, a single bit (e.g., a bit $B_1$) in the DCI, the MAC header, or the MAC subheader may indicate whether the random access response message applies timing advance simplification. For example, $B_1$ may be set to 0 to indicate that the random access response message applies timing advance simplification. Therefore, in this example, $B_1$ may be set to 0 to indicate that the random access response message does not include a timing advance MAC CE or to indicate that the random access response message includes a timing advance increment MAC CE. In another example implementation, if the 2-bit message format indicator is used, two bits (e.g., bits $B_1$ and $B_2$ forming a two-bit word '$B_1B_2$') in the DCI, the MAC header, or the MAC subheader may indicate whether the random access response message applies timing advance simplification. In one example, the UE 600 may detect that $B_1$ and $B_2$ are both be set to 0 indicating that the random access response message applies timing advance simplification. Therefore, in this example, the UE 600 may determine that the random access response message does not include a timing advance MAC CE. In another example, the UE 600 may detect that $B_1$ is set to 1 and $B_2$ is set to 0 to indicate that the random access response message applies timing advance simplification. Therefore, in this example, the UE 600 may determine that the random access response message includes an N-bit timing advance increment MAC CE.

At 1324, if the random access response message 1318 applies timing advance simplification, the UE 600 may maintain or update the timing advance value for the serving base station 500. For example, the UE 600 may maintain the timing advance value corresponding to the serving base station 500 if a timing advance MAC CE (e.g., a full-size timing advance MAC CE) or a timing advance increment MAC CE is not included in the random access response message 1318. As another example, the UE 600 may update the timing advance value corresponding to the serving base station 500 if the random access response message 1318 includes a timing advance increment MAC CE. In this example, the UE may update the timing advance value for the serving base station 500 by increasing an existing timing advance value stored in a memory (e.g., memory 605) for the serving base station 500 by a delta value (Δ) included in the timing advance increment MAC CE. The UE may then store the result (also referred to as an updated timing advance value) in the memory.

The UE 600 may apply the timing advance value corresponding to the serving base station 500 to UL transmissions (e.g., transmission of the UL message 1326). In some examples, the UL message 1326 may be referred to as a subsequent random access message. For example, the UL message 1326 may include UL data immediately following a message 1 transmission or a message A transmission. Therefore, in one example scenario, the UE 600 may apply the original timing advance value for the serving base station 500 (e.g., the timing advance value in the message 1302), when the random access response message 1318 applies timing advance simplification and is transmitted without a timing advance MAC CE. In another example scenario, the UE 600 may apply an updated timing advance value for the serving base station 500, when the random access response message 1318 applies timing advance simplification and is transmitted with a timing advance increment MAC CE.

Figure 14:
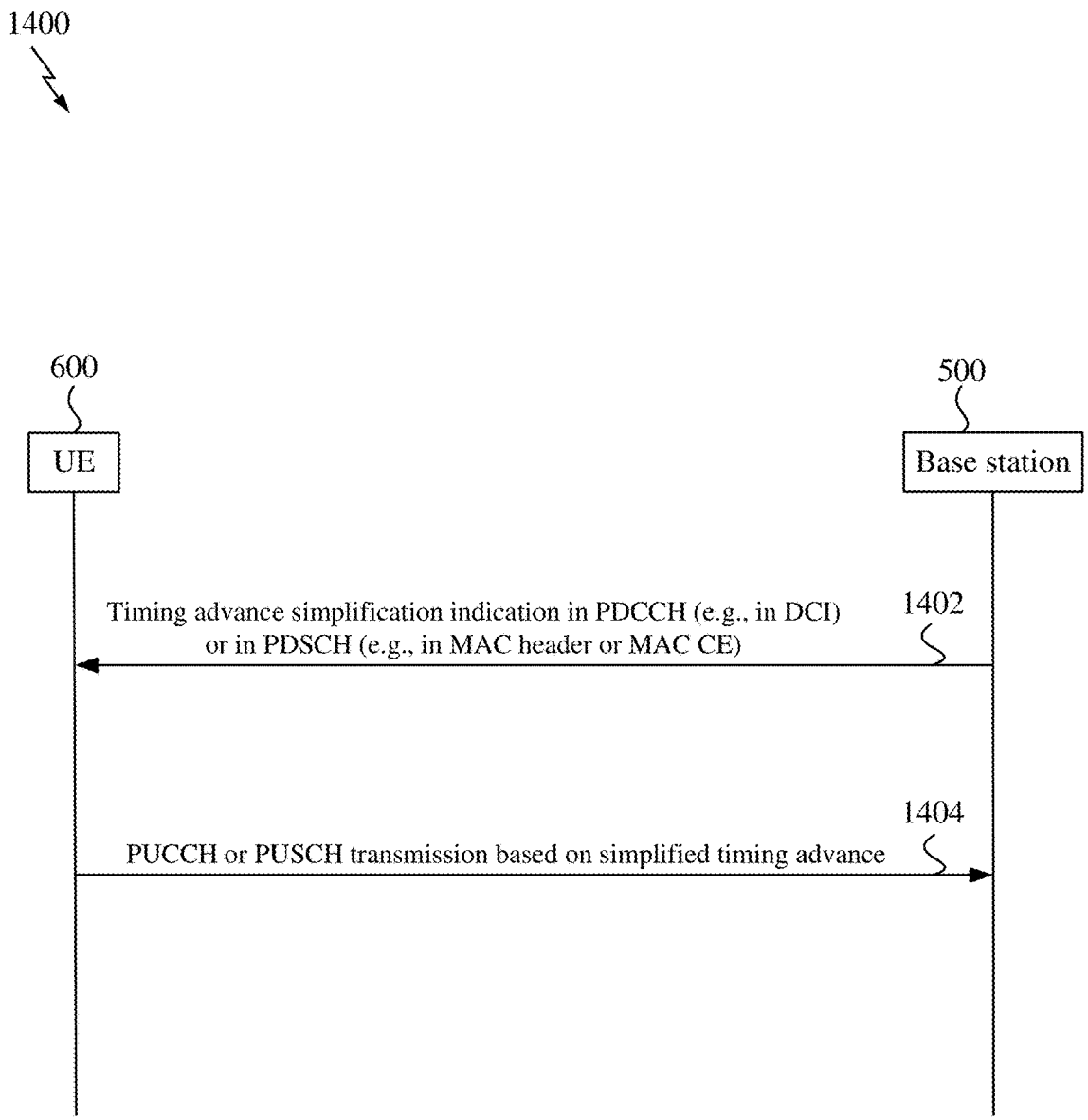
FIG. 14 is a signal flow diagram illustrating an example implementation of timing advance simplification in accordance with various aspects of the disclosure.

FIG. 14 is a signal flow diagram 1400 illustrating an example implementation of timing advance simplification in accordance with various aspects of the disclosure. The serving base station 500 may transmit a timing advance simplification indication 1402 in PDCCH or in PDSCH. In some aspects of the disclosure, the timing advance simplification indication 1402 may be the 1-bit or 2-bit RAR message format indicator described herein. In one example, the timing advance simplification indication 1402 may be included in a DCI in the PDCCH. In another example, the timing advance simplification indication 1402 may be included in a MAC header or a MAC CE in the PDSCH. In some examples, the timing advance simplification indication 1402 may be included in a random access response message.

The UE 600 may perform a PUCCH or PUSCH transmission 1404 based on the indicated simplified timing advance. Therefore, in one example, if the timing advance simplification indication 1402 indicates that TA signaling overhead is reduced (e.g., a 12-bit TA MAC CE is not provided to the UE 600 in a random access response message to reduce signaling overhead), the UE 600 may perform the PUCCH or PUSCH transmission 1404 based on a timing advance value stored at the UE 600.

Figure 15:
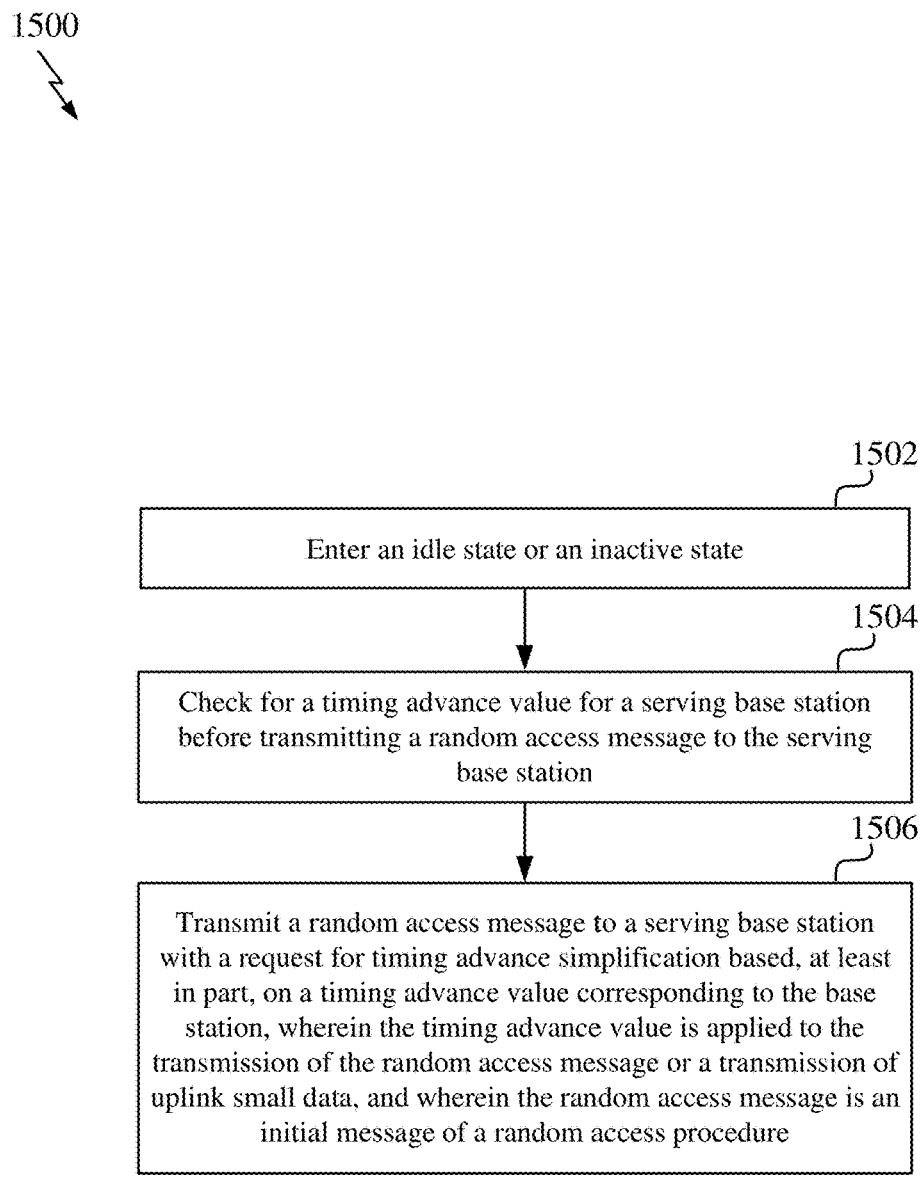
FIG. 15 is a flow chart illustrating an exemplary timing advance simplification procedure in accordance with some aspects of the present disclosure.

FIG. 15 is a flow chart illustrating an exemplary procedure 1500 for timing advance simplification in accordance with some aspects of the present disclosure. As described below, some or all illustrated features may be omitted in a particular implementation within the scope of the present disclosure, and some illustrated features may not be required for implementation of all embodiments. In some examples, the procedure 1500 may be carried out by the UE 600 illustrated in FIG. 6. In some examples, the procedure 1500 may be carried out by any suitable apparatus or means for carrying out the functions or algorithm described below.

At 1502, the UE may enter an idle state or an inactive state. For example, when the UE is in the RRC idle state, the network may consider the UE to be in sleep mode and may not transfer data to the UE. The UE may periodically wake up to receive paging messages from the network and the mobility is managed by the UE through cell selection. As another example, the RRC inactive state may be considered to be a primary sleeping state for the UE prior to transition to the RRC idle state in order to save power and to allow fast connection setup.

At 1504, the UE may check for a record (e.g., a timing advance (TA) record) of a timing advance value for a serving base station (e.g., the serving base station 500) before transmitting a message to the serving base station in the idle state or the inactive state. In one example, the UE may check for a TA record by accessing a memory (e.g., the memory 605 in FIG. 6) and searching for the TA record corresponding to the serving base station. For example, as previously described with reference to 1210 in FIG. 12, a TA record may include at least one of a cell ID corresponding to the serving base station, an antenna panel ID corresponding to the serving base station, a subcarrier spacing of an initial uplink bandwidth part (BWP), and the timing advance value. Accordingly, the UE may check for the TA record corresponding to the serving base station by determining the cell ID or antenna panel ID of the serving base station and searching for a TA record that includes the determined cell ID or antenna panel ID. In some examples, the message may be a random access message (e.g., the message 1 704 or the message A 804) of a contention based random access procedure or a contention free random access procedure. In some examples, such random access message may include at least a physical random access channel (PRACH) preamble. In some examples, the random access message includes uplink (UL) data to be transferred to the serving base station.

At 1506, the UE may transmit a random access message to a serving base station with a request for timing advance simplification based, at least in part, on a timing advance value corresponding to the base station, wherein the timing advance value is applied to the transmission of the random access message or a transmission of uplink small data, and wherein the random access message is an initial message of a random access procedure. In some examples, the timing advance value may be from a record of the timing advance value for the serving base station. For example, the UE may transmit the random access message to the serving base station with a request for timing advance simplification by including a request for timing advance simplification in the random access message (e.g., the message 1 704 or the message A 804) as previously described with reference to 1216, 1220 in FIG. 12A. In some examples, the random access message may be the message 1314 in FIG. 13.

Uplink small data may refer to data that a UE in the RRC idle or inactive state can transmit with an initial random access channel (RACH) transmission. For example, the UE can transmit the uplink small data without transitioning to an RRC active state. Uplink small data transmissions may enable a UE (e.g., a UE that occasionally needs to transmit a small amount of data to a base station) to transmit small amounts of data without switching to the RRC active state, thereby reducing power consumption at the UE and reducing consumption of network resources. In some examples, the uplink small data may be provided by a user plane or a control plane of the UE. In some implementations, the uplink small data may be included in a MAC service data unit (SDU) and multiplexed with a MAC CE carrying a random access message.

Figure 16A:
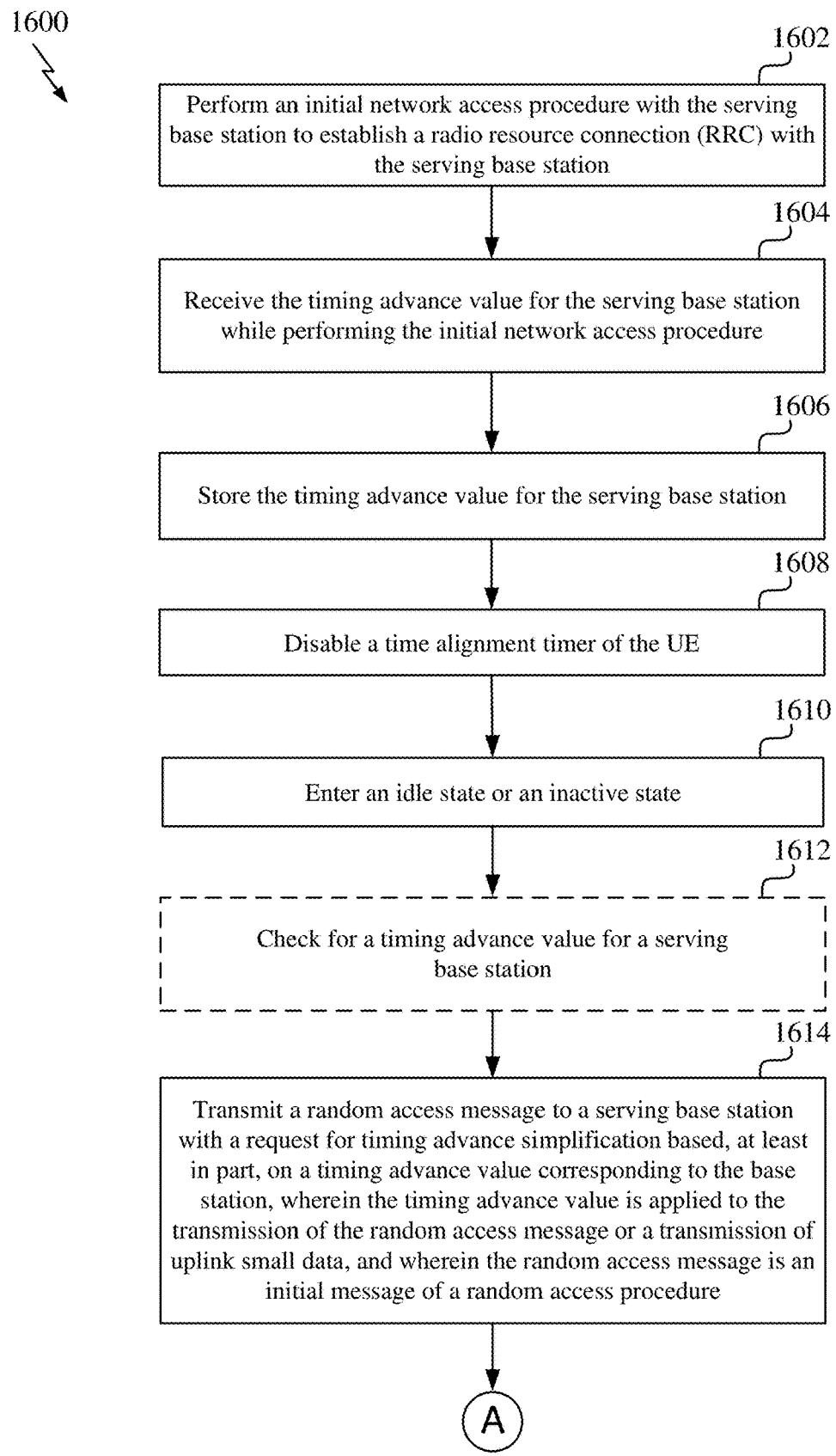
FIG. 16 (including FIGS. 16A and 16B) is a flow chart illustrating an exemplary timing advance simplification procedure in accordance with various aspects of the present disclosure.
Figure 16B:
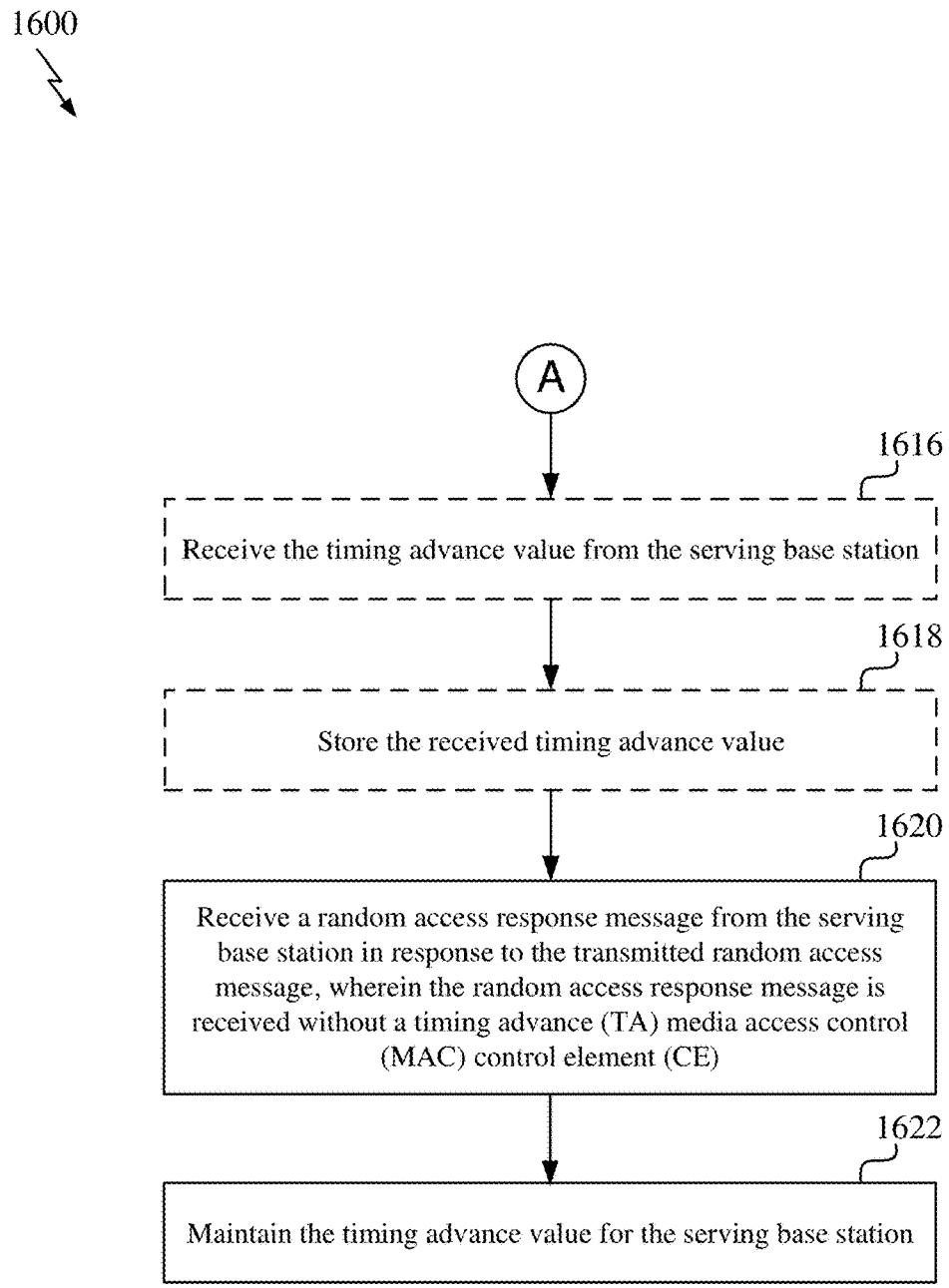

FIG. 16 (including FIGS. 16A and 16B) is a flow chart illustrating an exemplary procedure 1600 for timing advance simplification in accordance with some aspects of the present disclosure. As described below, some or all illustrated features may be omitted in a particular implementation within the scope of the present disclosure, and some illustrated features may not be required for implementation of all embodiments. In some examples, the procedure 1600 may be carried out by the UE 600 illustrated in FIG. 6. In some examples, the procedure 1600 may be carried out by any suitable apparatus or means for carrying out the functions or algorithm described below. It should be understood that operations shown with dashed lines in FIG. 16 indicate optional operations.

With reference to FIG. 16A, at 1602, the UE may perform an initial network access procedure with the serving base station to establish a radio resource connection (RRC) with the serving base station. The initial network access procedure may be a contention based random access procedure or a contention free random access procedure. For example, the initial network access procedure may be the previously described 4-step RA procedure 700, which may be initiated by the UE 600 for initial access to the network (e.g., to achieve UL synchronization with the serving base station 500). As another example, the initial network access procedure may be the previously described 2-step RA procedure 800, which may be initiated by the UE 600 for initial access to the network (e.g., to achieve UL synchronization with the serving base station 500).

At 1604, the UE may receive the timing advance value for the serving base station while performing the initial network access procedure. For example, with reference to FIG. 13, the UE 600 may receive the timing advance value for the serving base station 500 in the message 1302. For example, the timing advance value may be received as a full size (e.g., 12-bit) timing advance (TA) media access control (MAC) control element (CE). In some examples, the timing advance value may be received in a random access response message from the serving base station in response to a random access message from the UE.

At 1606, the UE may store the timing advance value for the serving base station. For example, the UE 600 shown in FIG. 6 may store a record of the timing advance value for the serving base station in the memory 605.

At 1608, the UE may disable a time alignment timer of the UE. As previously described, the time alignment timer may be a timer at the UE indicating a period of time for which the UE may assume a cell to be uplink time aligned. In some examples, the value of the time alignment timer may be RRC configured. In some aspects of the disclosure, the UE may disable the time alignment timer by setting the time alignment timer to infinity.

At 1610, the UE may enter an idle state or an inactive state. For example, when the UE is in the RRC idle state, the network may consider the UE to be in sleep mode and may not transfer data to the UE. The UE may periodically wake up to receive paging messages from the network and the mobility is managed by the UE through cell selection. As another example, the RRC inactive state may be considered to be a primary sleeping state for the UE prior to transition to the RRC idle state in order to save power and to allow fast connection setup.

At 1612, the UE may check for a timing advance value for a serving base station. In some aspects, the UE may check for the record of the timing advance value before transmitting a message to the serving base station in the idle state or the inactive state. For example, the UE 600 shown in FIG. 6 may have a record of the timing advance value for the serving base station stored in the memory 605. In this example, the UE 600 may check for the record of the timing advance value by accessing the memory 605 and searching for a cell ID corresponding to the serving base station or an antenna panel ID corresponding to the serving base station.

At 1614, the UE may transmit a random access message to a serving base station with a request for timing advance simplification based, at least in part, on a timing advance value corresponding to the base station, wherein the timing advance value is applied to the transmission of the random access message or a transmission of uplink small data, and wherein the random access message is an initial message of a random access procedure. In some examples, the timing advance value for the serving base station is associated with at least one of a cell ID corresponding to the serving base station, an antenna panel ID corresponding to the serving base station, and a subcarrier spacing of an initial uplink bandwidth part (BWP). In some examples, the timing advance value may be from a record of the timing advance value for the serving base station. For example, the UE may transmit the random access message to the serving base station with a request for timing advance simplification by including a request for timing advance simplification in the random access message (e.g., the message 1 704 or the message A 804) as previously described with reference to 1216, 1220 in FIG. 12A. In some examples, the random access message may be the message 1314 in FIG. 13.

With reference to FIG. 16B, at 1616, the UE may receive the timing advance value from the serving base station. In some examples, the UE may receive the timing advance value if a record of the timing advance value is null.

At 1618, the UE may store the record of the timing advance value for the serving base station.

At 1620, the UE may receive a random access response message from the serving base station in response to the transmitted random access message, wherein the random access response message is received without a timing advance (TA) media access control (MAC) control element (CE). Therefore, the absence of the TA MAC CE (e.g., a 12-bit TA MAC CE) may effectively reduce signaling overhead with respect to the random access response message from the serving base station. In some examples, the random access response message from the serving base station may be the message 1318 in FIG. 13.

At 1622, the UE may maintain the timing advance value for the serving base station. For example, the UE may maintain the timing advance value by preserving an existing timing advance value for the serving base station stored at the UE. In this example, the timing advance value may not be reset, changed, and/or deleted.

Figure 17:
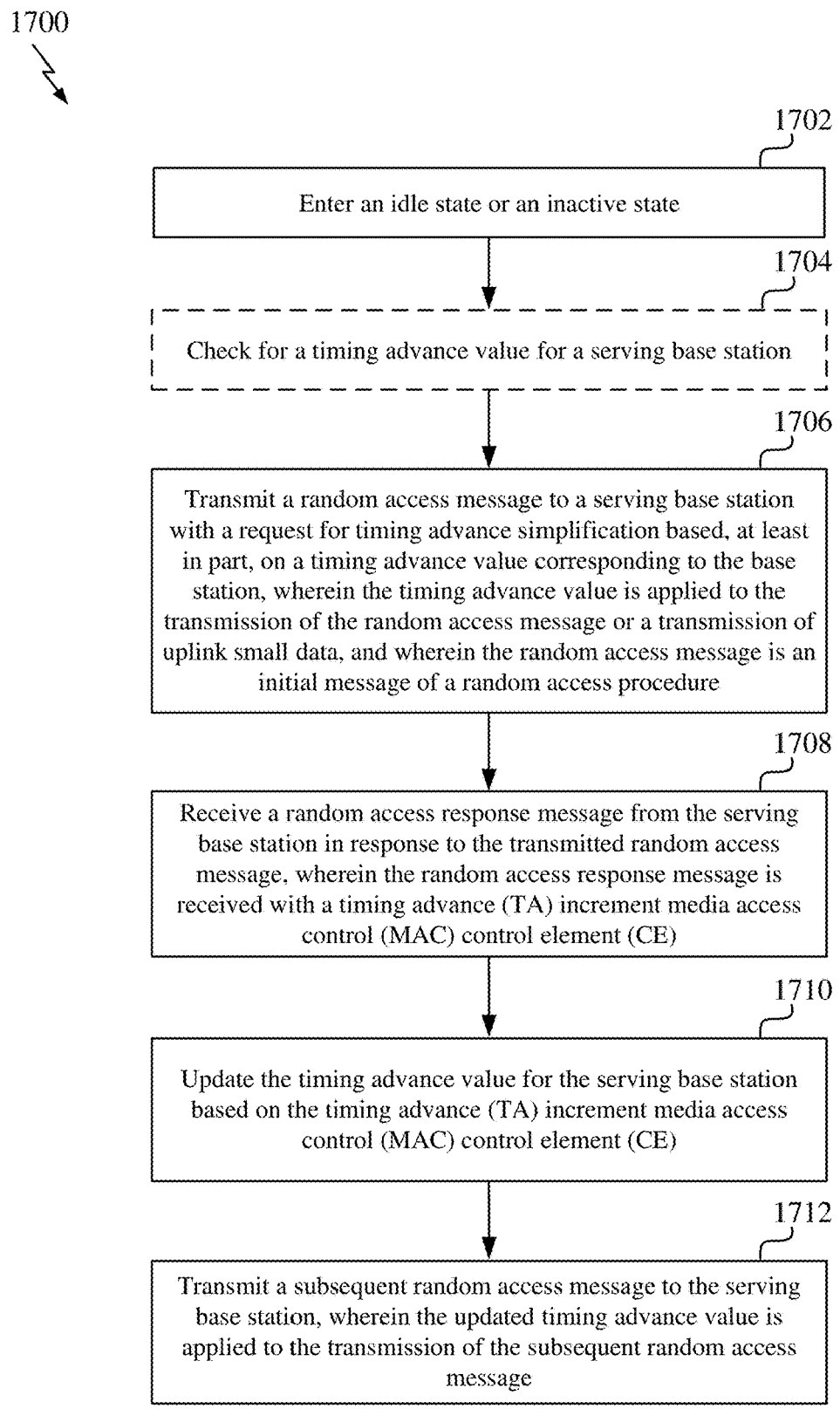
FIG. 17 is a flow chart illustrating an exemplary timing advance simplification procedure in accordance with various aspects of the present disclosure.

FIG. 17 is a flow chart illustrating an exemplary procedure 1700 for timing advance simplification in accordance with some aspects of the present disclosure. As described below, some or all illustrated features may be omitted in a particular implementation within the scope of the present disclosure, and some illustrated features may not be required for implementation of all embodiments. In some examples, the procedure 1700 may be carried out by the UE 600 illustrated in FIG. 6. In some examples, the procedure 1700 may be carried out by any suitable apparatus or means for carrying out the functions or algorithm described below. It should be understood that operations shown with dashed lines in FIG. 17 indicate optional operations.

With reference to FIG. 17, at 1702, the UE may enter an idle state or an inactive state. For example, when the UE is in the RRC idle state, the network may consider the UE to be in sleep mode and may not transfer data to the UE. The UE may periodically wake up to receive paging messages from the network and the mobility is managed by the UE through cell selection. As another example, the RRC inactive state may be considered to be a primary sleeping state for the UE prior to transition to the RRC idle state in order to save power and to allow fast connection setup.

At 1704, the UE may check for a timing advance value for a serving base station. In some aspects, the UE may check for the timing advance value before transmitting a message to the serving base station in the idle state or the inactive state. For example, the UE 600 shown in FIG. 6 may have a record of the timing advance value for the serving base station stored in the memory 605. In this example, the UE 600 may check for the record of the timing advance value by accessing the memory 605 and searching for a cell ID corresponding to the serving base station or an antenna panel ID corresponding to the serving base station.

At 1706, the UE may transmit a random access message to a serving base station with a request for timing advance simplification based, at least in part, on a timing advance value corresponding to the base station, wherein the timing advance value is applied to the transmission of the random access message or a transmission of uplink small data, and wherein the random access message is an initial message of a random access procedure. In some examples, the timing advance value may be from a record of the timing advance value for the serving base station. For example, the UE may transmit the random access message to the serving base station with a request for timing advance simplification by including a request for timing advance simplification in the random access message (e.g., the message 1 704 or the message A 804) as previously described with reference to 1216, 1220 in FIG. 12A. In some examples, the random access message may be the message 1314 in FIG. 13.

At 1708, the UE may receive a random access response message from the serving base station in response to the transmitted random access message, wherein the random access response message is received with a timing advance (TA) increment media access control (MAC) control element (CE). In some examples, the timing advance (TA) increment media access control (MAC) control element (CE) includes N bits, where 0≤N<12. In some examples, the random access response message from the serving base station may be the message 1318 in FIG. 13.

At 1710, the UE may update the timing advance value for the serving base station based on the timing advance (TA) increment media access control (MAC) control element (CE). For example, the UE may update the timing advance value for the serving base station by increasing an existing timing advance value stored in a memory (e.g., memory 605) for the serving base station by a delta value (Δ) included in the TA increment MAC CE. The UE may then store the result (also referred to as an updated timing advance value) in the memory.

At 1712, the UE may transmit a subsequent random access message to the serving base station, wherein the updated timing advance value is applied to the transmission of the subsequent random access message. In some examples, the subsequent random access message may be the HARQ acknowledgement (ACK) message 712 or the HARQ acknowledgement (ACK) message 808. In some examples, the subsequent random access message is a physical uplink shared channel (PUSCH) transmission or a physical uplink control channel (PUCCH) transmission of a contention based random access procedure or a contention free random access procedure, wherein the PUSCH transmission or the PUCCH transmission acknowledges a successful decoding of the random access response message. In some examples, the subsequent random access message may be the UL message 1326 in FIG. 13.

Figure 18:
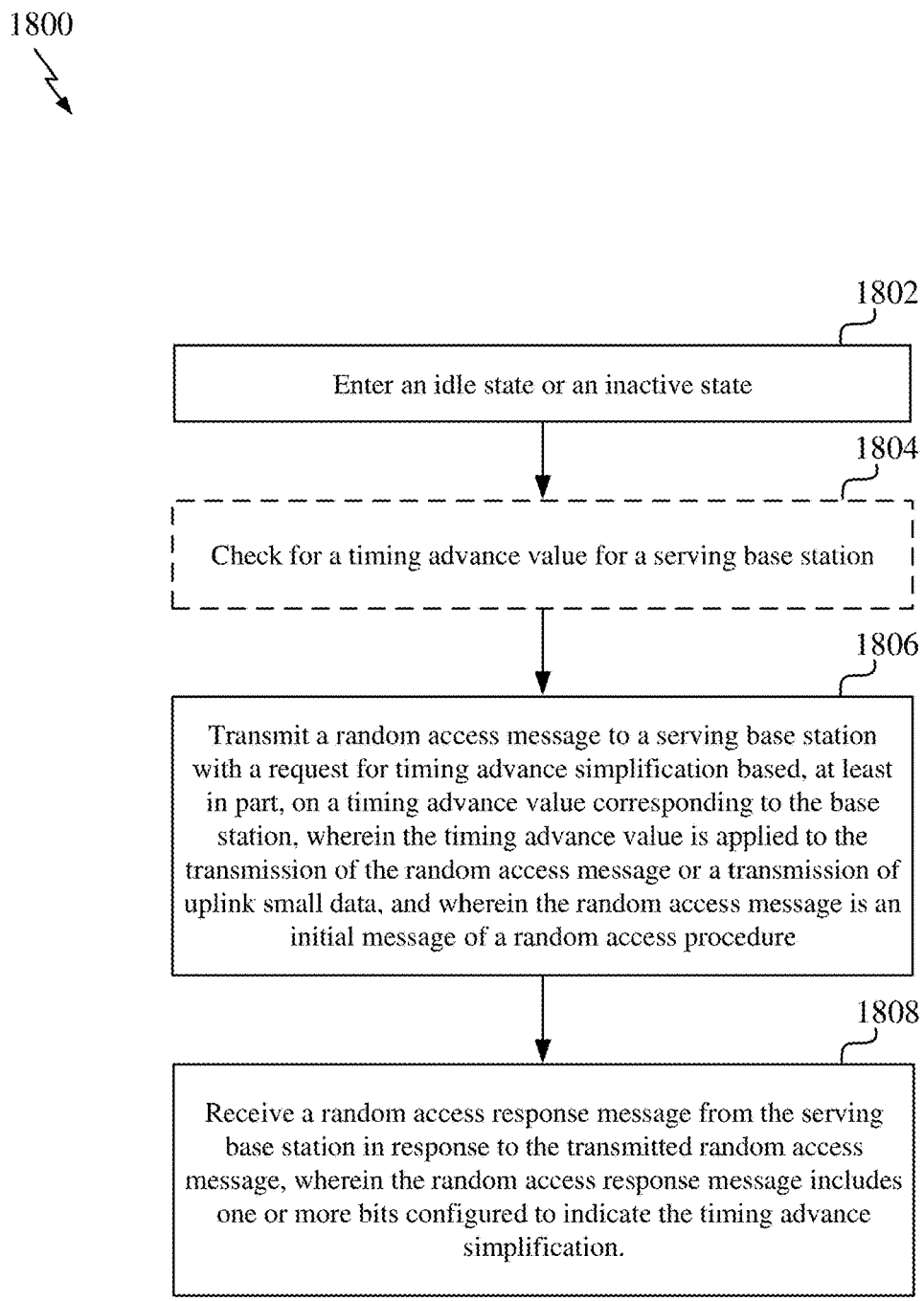
FIG. 18 is a flow chart illustrating an exemplary timing advance simplification procedure in accordance with various aspects of the present disclosure.

FIG. 18 is a flow chart illustrating an exemplary procedure 1800 for timing advance simplification in accordance with some aspects of the present disclosure. As described below, some or all illustrated features may be omitted in a particular implementation within the scope of the present disclosure, and some illustrated features may not be required for implementation of all embodiments. In some examples, the procedure 1800 may be carried out by the UE 600 illustrated in FIG. 6. In some examples, the procedure 1800 may be carried out by any suitable apparatus or means for carrying out the functions or algorithm described below. It should be understood that operations shown with dashed lines in FIG. 18 indicate optional operations.

With reference to FIG. 18, at 1802, the UE may enter an idle state or an inactive state. For example, when the UE is in the RRC idle state, the network may consider the UE to be in sleep mode and may not transfer data to the UE. The UE may periodically wake up to receive paging messages from the network and the mobility is managed by the UE through cell selection. As another example, the RRC inactive state may be considered to be a primary sleeping state for the UE prior to transition to the RRC idle state in order to save power and to allow fast connection setup.

At 1804, the UE may check for a timing advance value for a serving base station. In some aspects, the UE may check for the timing advance value before transmitting a message to the serving base station in the idle state or the inactive state. For example, the UE 600 shown in FIG. 6 may have a record of the timing advance value for the serving base station stored in the memory 605. In this example, the UE 600 may check for the record of the timing advance value by accessing the memory 605 and searching for the cell ID corresponding to the serving base station or antenna panel ID corresponding to the serving base station.

At 1806, the UE may transmit a random access message to a serving base station with a request for timing advance simplification based, at least in part, on a timing advance value corresponding to the base station, wherein the timing advance value is applied to the transmission of the random access message or a transmission of uplink small data, and wherein the random access message is an initial message of a random access procedure. In some examples, the timing advance value may be from a record of the timing advance value for the serving base station. For example, the UE may transmit the random access message to the serving base station with a request for timing advance simplification by including a request for timing advance simplification in the random access message (e.g., the message 1 704 or the message A 804) as previously described with reference to 1216, 1220 in FIG. 12A. In some examples, the random access message may be the message 1314 in FIG. 13.

At 1808, the UE may receive a random access response message from the serving base station in response to the transmitted random access message, wherein the random access response message includes one or more bits configured to indicate the timing advance simplification. In some aspects of the disclosure, the one or more bits are included in downlink control information (DCI) of a physical downlink control channel (PDCCH), a media access control (MAC) header of a physical downlink shared channel (PDSCH), or a MAC sub-header of the PDSCH. In some examples, the random access response message from the serving base station may be the message 1318 in FIG. 13. In some examples, the transmitted random access message (e.g., from the UE) may be a message of a random access procedure the UE performs to re-establish or resume a radio resource connection (RRC).

Figure 19:
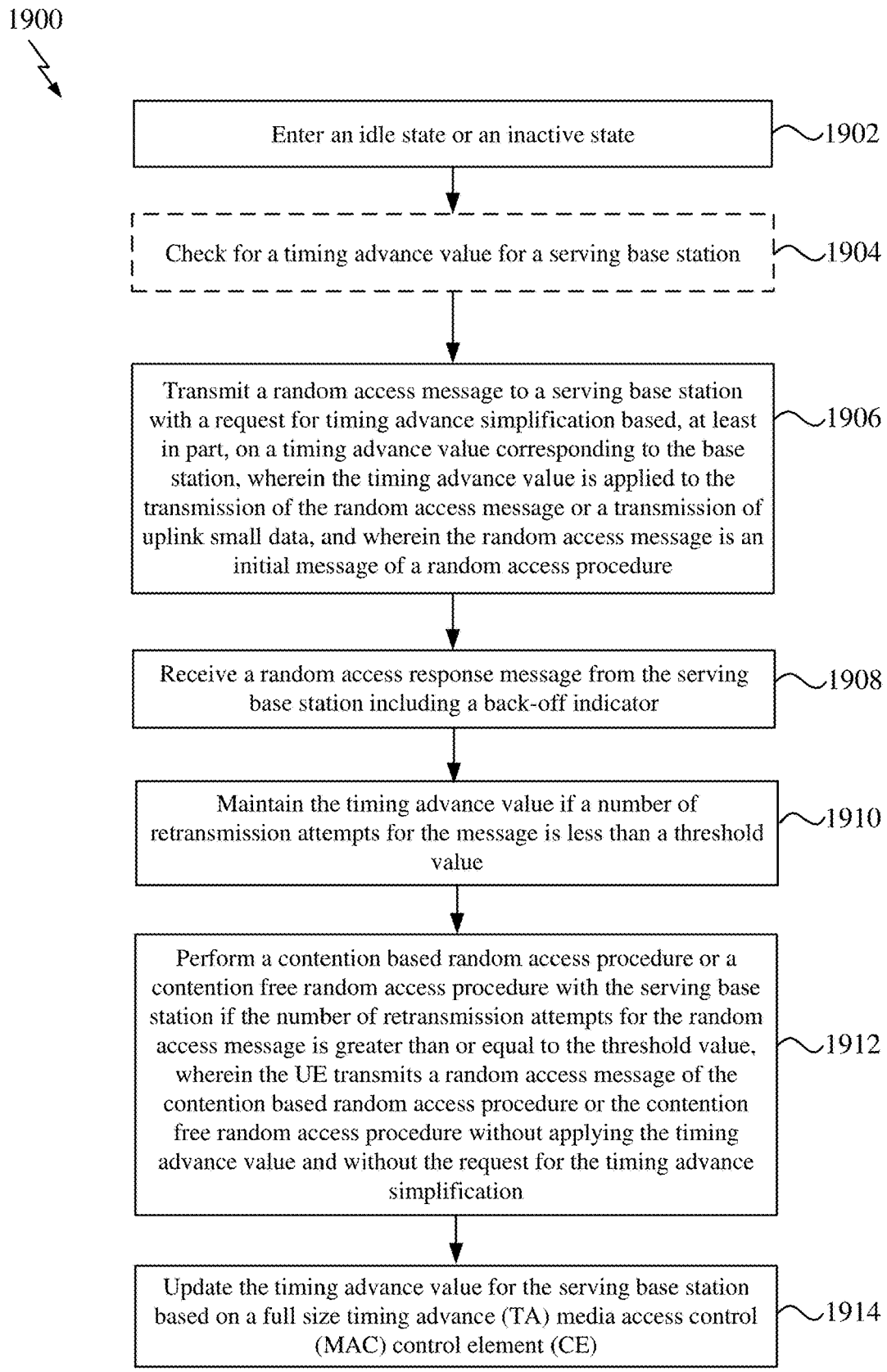
FIG. 19 is a flow chart illustrating an exemplary timing advance simplification procedure in accordance with various aspects of the present disclosure.

FIG. 19 is a flow chart illustrating an exemplary procedure 1900 for timing advance simplification in accordance with some aspects of the present disclosure. As described below, some or all illustrated features may be omitted in a particular implementation within the scope of the present disclosure, and some illustrated features may not be required for implementation of all embodiments. In some examples, the procedure 1900 may be carried out by the UE 600 illustrated in FIG. 6. In some examples, the procedure 1900 may be carried out by any suitable apparatus or means for carrying out the functions or algorithm described below. It should be understood that operations shown with dashed lines in FIG. 19 indicate optional operations.

At 1902, the UE may enter an idle state or an inactive state. For example, when the UE is in the RRC idle state, the network may consider the UE to be in sleep mode and may not transfer data to the UE. The UE may periodically wake up to receive paging messages from the network and the mobility is managed by the UE through cell selection. As another example, the RRC inactive state may be considered to be a primary sleeping state for the UE prior to transition to the RRC idle state in order to save power and to allow fast connection setup.

At 1904, the UE may check for a timing advance value for a serving base station. In some aspects, the UE may check for the timing advance value before transmitting a message to the serving base station in the idle state or the inactive state. For example, the UE 600 shown in FIG. 6 may have a record of the timing advance value for the serving base station stored in the memory 605. In this example, the UE 600 may check for the record of the timing advance value by accessing the memory 605 and searching for a cell ID corresponding to the serving base station or an antenna panel ID corresponding to the serving base station.

At 1906, the UE may transmit a random access message to a serving base station with a request for timing advance simplification based, at least in part, on a timing advance value corresponding to the base station, wherein the timing advance value is applied to the transmission of the random access message or a transmission of uplink small data, and wherein the random access message is an initial message of a random access procedure. In some examples, the timing advance value may be from a record of the timing advance value for the serving base station. For example, the UE may transmit the random access message to the serving base station with a request for timing advance simplification by including a request for timing advance simplification in the random access message (e.g., the message 1 704 or the message A 804) as previously described with reference to 1216, 1220 in FIG. 12A.

At 1908, the UE may receive a random access response message from the serving base station including a back-off indicator.

At 1910, the UE may maintain the timing advance value if a number of retransmission attempts for the random access message is less than a threshold value. For example, the UE may maintain the timing advance value by preserving an existing timing advance value for the serving base station stored at the UE. In this example, the timing advance value may not be reset, changed, and/or deleted.

At 1912, the UE may perform a contention based random access procedure or a contention free random access procedure with the serving base station if the number of retransmission attempts for the random access message is greater than or equal to the threshold value, wherein the UE transmits a random access message of the contention based random access procedure or the contention free random access procedure without applying the timing advance value and without the request for the timing advance simplification At 1914, the UE may update the timing advance value for the serving base station based on a full size timing advance (TA) media access control (MAC) control element (CE). For example, the UE may update the timing advance value for the serving base station based on the full size timing advance (TA) media access control (MAC) control element (CE) by replacing an existing timing advance value stored in a memory (e.g., memory 605) for the serving base station with a timing advance value included in the full size timing advance (TA) media access control (MAC) control element (CE).

Figure 20:
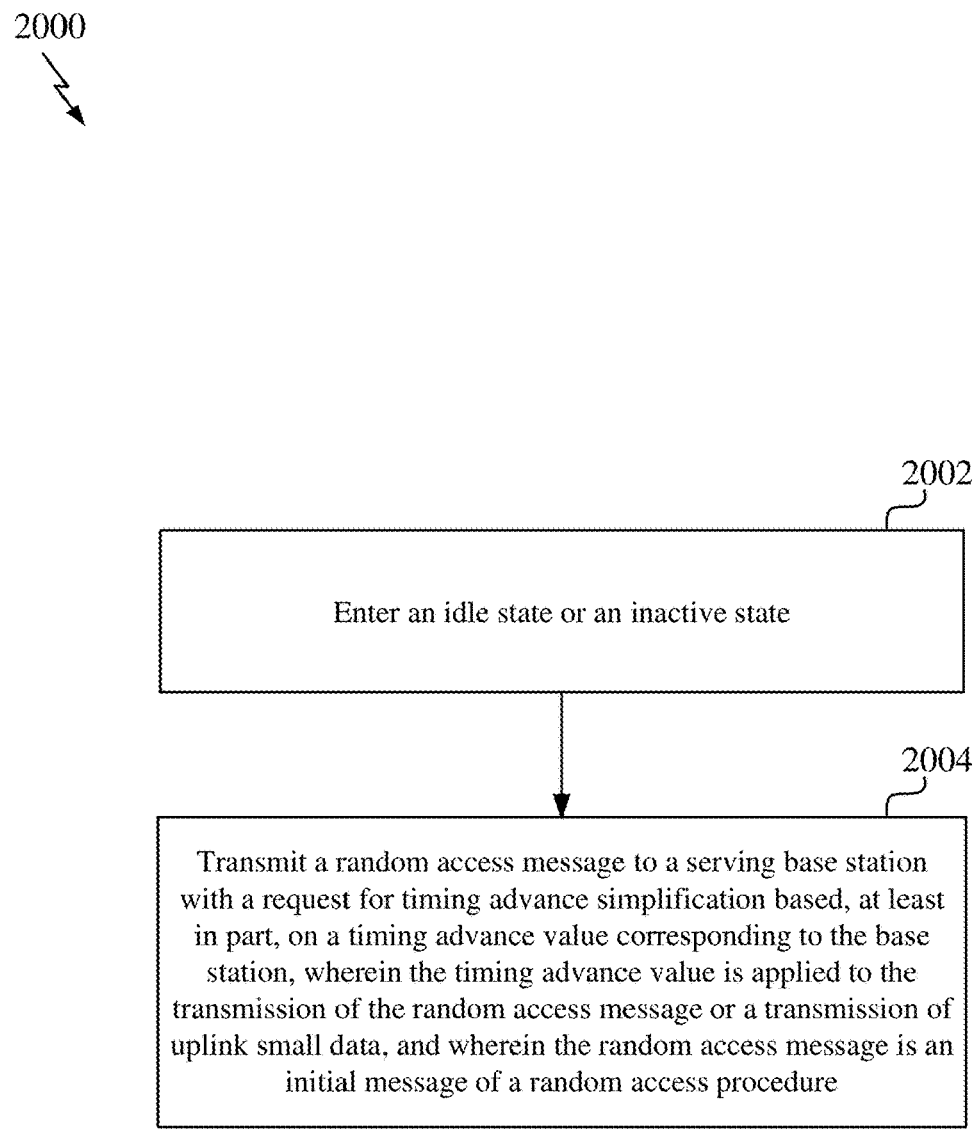
FIG. 20 is a flow chart illustrating an exemplary timing advance simplification procedure in accordance with various aspects of the present disclosure.

FIG. 20 is a flow chart illustrating an exemplary procedure 2000 for timing advance simplification in accordance with some aspects of the present disclosure. As described below, some or all illustrated features may be omitted in a particular implementation within the scope of the present disclosure, and some illustrated features may not be required for implementation of all embodiments. In some examples, the procedure 2000 may be carried out by the UE 600 illustrated in FIG. 6. In some examples, the procedure 2000 may be carried out by any suitable apparatus or means for carrying out the functions or algorithm described below.

At 2002, the UE may enter an idle state or an inactive state. For example, when the UE is in the RRC idle state, the network may consider the UE to be in sleep mode and may not transfer data to the UE. The UE may periodically wake up to receive paging messages from the network and the mobility is managed by the UE through cell selection. As another example, the RRC inactive state may be considered to be a primary sleeping state for the UE prior to transition to the RRC idle state in order to save power and to allow fast connection setup.

At 2004, the UE may transmit a random access message to a serving base station with a request for timing advance simplification based, at least in part, on a timing advance value corresponding to the base station, wherein the timing advance value is applied to the transmission of the random access message or a transmission of uplink small data, and wherein the random access message is an initial message of a random access procedure. In some examples, the timing advance value may be from a record of the timing advance value for the serving base station. For example, the UE may transmit the random access message to the serving base station with a request for timing advance simplification by including a request for timing advance simplification in the random access message (e.g., the message 1 704 or the message A 804) as previously described with reference to 1216, 1220 in FIG. 12A. In some examples, the random access message may be the message 1314 in FIG. 13.

Figure 21:
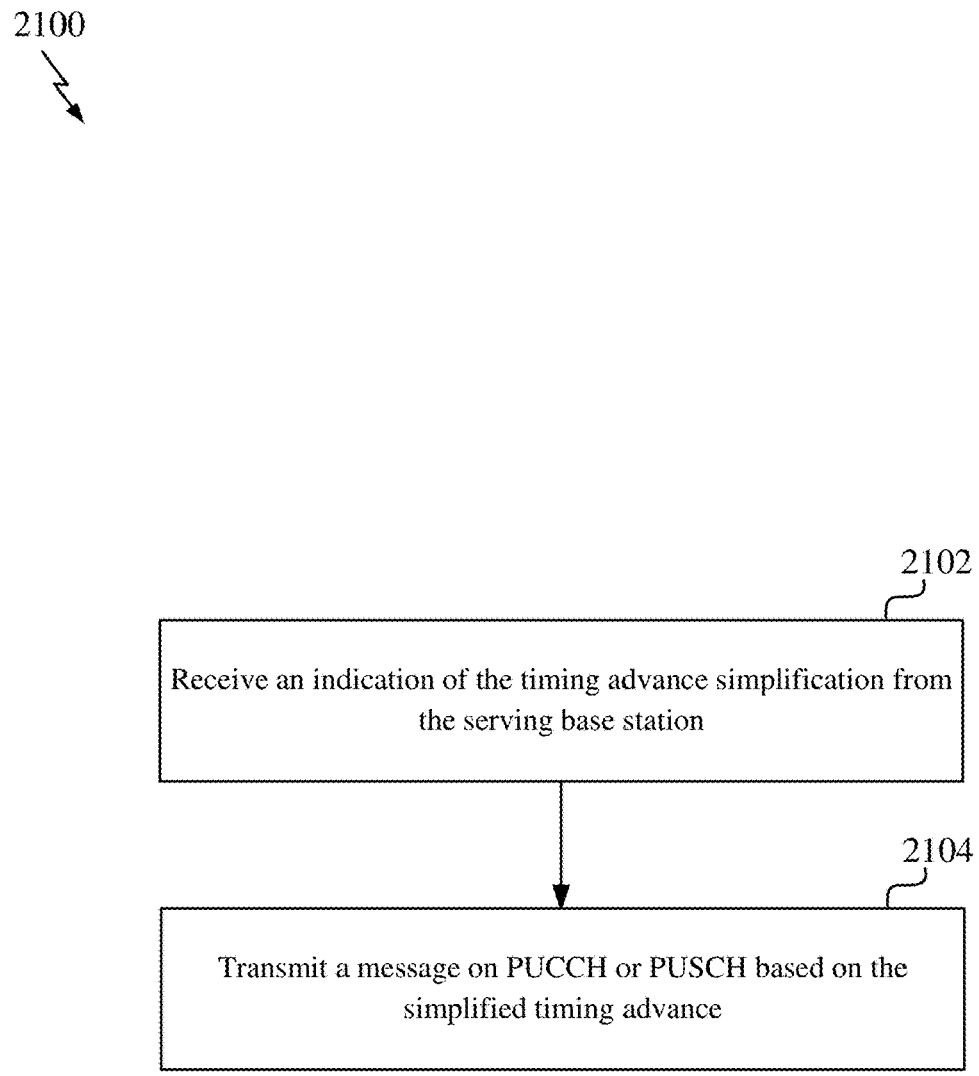
FIG. 21 is a flow chart illustrating an exemplary procedure for timing advance simplification in accordance with various aspects of the present disclosure.

FIG. 21 is a flow chart illustrating an exemplary procedure 2100 for timing advance simplification in accordance with some aspects of the present disclosure. As described below, some or all illustrated features may be omitted in a particular implementation within the scope of the present disclosure, and some illustrated features may not be required for implementation of all embodiments. In some examples, the procedure 2100 may be carried out by the UE 600 illustrated in FIG. 6. In some examples, the procedure 2100 may be carried out by any suitable apparatus or means for carrying out the functions or algorithm described below.

At 2102, the UE may receive an indication of the timing advance simplification from the serving base station. For example, with reference to FIG. 14 the UE may receive the timing advance simplification indication 1402 in PDCCH or in PDSCH. In some aspects of the disclosure, the timing advance simplification indication may be the 1-bit or 2-bit RAR message format indicator described herein. In some examples, the timing advance simplification indication 1402 may be included in a random access response message, which may be received in response to a random access message from the UE. In some examples, the random access message may be a message of a random access procedure a UE performs to re-establish or resume a radio resource connection (RRC).

At 2104, the UE may transmit a message on the PUCCH or PUSCH based on simplified timing advance. For example, with reference to FIG. 14, the UE may perform a PUCCH or PUSCH transmission 1404 based on the indicated simplified timing advance. In one example, if the timing advance simplification indication indicates that timing advance signaling overhead is reduced (e.g., a 12-bit TA MAC CE is not provided to the UE 600 in a random access response message to reduce signaling overhead), the UE 600 may perform the PUCCH or PUSCH transmission based on a timing advance value stored at the UE 600.

Figure 22:
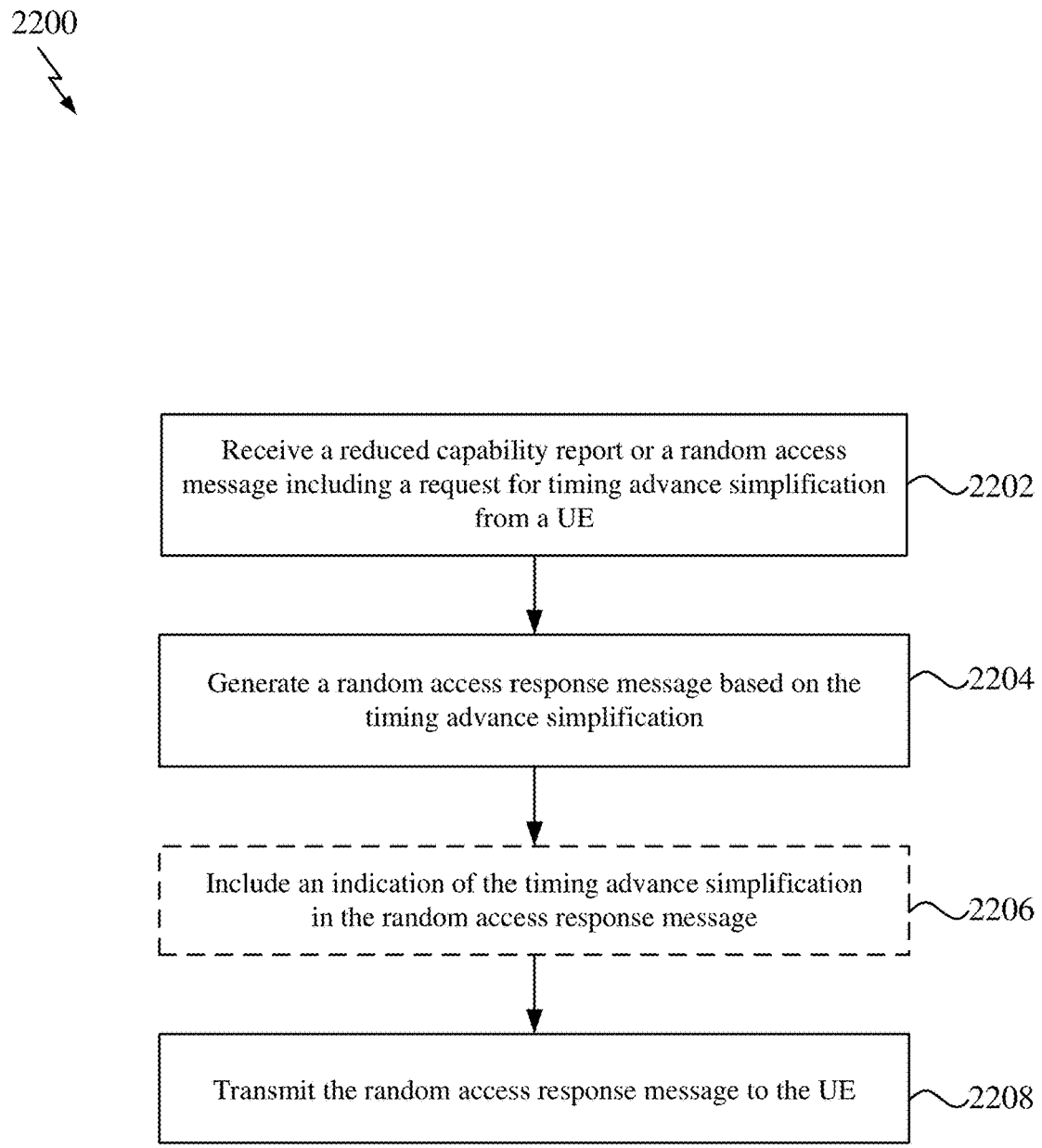
FIG. 22 is a flow chart illustrating an exemplary procedure for timing advance simplification in accordance with various aspects of the present disclosure.

FIG. 22 is a flow chart illustrating an exemplary procedure 2200 for timing advance simplification in accordance with some aspects of the present disclosure. As described below, some or all illustrated features may be omitted in a particular implementation within the scope of the present disclosure, and some illustrated features may not be required for implementation of all embodiments. In some examples, the procedure 2200 may be carried out by the base station 500 illustrated in FIG. 5. In some examples, the procedure 2200 may be carried out by any suitable apparatus or means for carrying out the functions or algorithm described below. It should be understood that operations shown with dashed lines in FIG. 22 indicate optional operations.

At 2202, the base station (also referred to as a serving base station) may receive a reduced capability report or a random access message including a request for timing advance simplification from a UE. In some examples, the random access message may be the message 1314 in FIG. 13. In some examples, the network access procedure enables the UE to re-establish or resume a radio resource connection (RRC).

At 2204, the base station may generate a random access response message based on timing advance simplification. In some aspects of the disclosure, the random access response message based on the timing advance simplification may have reduced signaling overhead. In one example, the base station may generate the random access response message without a timing advance MAC CE (also referred to as a TA MAC CE). The base station may generate the random access response message without a timing advance MAC CE when the base station determines that the TA record stored at the UE for the base station is valid and does not require a correction or update. In another example, the base station may generate the random access response message with a timing advance increment MAC CE (also referred to as a TA increment MAC CE). The base station may generate the random access response message with a timing advance increment MAC CE when the base station determines that the TA record stored at the UE for the base station needs to be updated by a delta value (Δ), where $-2^{N-1} < \Delta < 2^{N-1}$. For example, the delta value (Δ) may be a timing offset determined by the base station for a message of a random access procedure transmitted from the UE (e.g., a message 1 or a message A transmitted from the UE). For example, with reference to 1316 in FIG. 13, the serving base station 500 may generate a random access response message (e.g., the random access response message 1318) with timing advance simplification.

At 2206, the base station may include an indication of the timing advance simplification in the random access response message. In some aspects of the present disclosure, the base station may use a 1-bit (e.g., a bit $B_1$) or 2-bit (e.g., bits $B_1$ and $B_2$ forming a two-bit word '$B_1B_2$') random access response message format as described herein to indicate the timing advance simplification to the UE.

At 2208, the base station may transmit the random access response message to the UE. In some examples, the random access response message may be the message 1318 in FIG. 13.

In one configuration, the apparatus 500 for wireless communication includes means for receiving a reduced capability report or a random access message including a request for timing advance simplification from a user equipment (UE), means for generating a random access response message based on the timing advance simplification, means for transmitting the random access response message to the UE, and means for including an indication of the timing advance simplification in a random access response message.

In one aspect, the aforementioned means may be the processor(s) 504 shown in FIG. 5 configured to perform the functions recited by the aforementioned means. In another aspect, the aforementioned means may be a circuit or any apparatus configured to perform the functions recited by the aforementioned means.

In one configuration, the apparatus 600 for wireless communication includes means for entering an idle state or an inactive state, means for checking for a timing advance value for a serving base station, means for transmitting a random access message to a serving base station with a request for timing advance simplification based, at least in part, on a timing advance value corresponding to the base station, wherein the timing advance value is applied to the transmission of the random access message or a transmission of uplink small data, and wherein the random access message is an initial message of a random access procedure, means for performing an initial network access procedure with the serving base station to establish a radio resource connection (RRC) with the serving base station, means for receiving the timing advance value for the serving base station while performing the initial network access procedure, means for storing the record of the timing advance value for the serving base station, means for disabling a time alignment timer of the apparatus, means for receiving the timing advance value from the serving base station, receiving an indication of the timing advance simplification from the serving base station in response to the transmitted random access message, means for receiving a random access response message from the serving base station in response to the transmitted random access message, wherein the random access response message is received without a timing advance (TA) media access control (MAC) control element (CE), means for maintaining the timing advance value for the serving base station, means for receiving a random access response message from the serving base station in response to the transmitted random access message, wherein the random access response message is received with a timing advance (TA) increment media access control (MAC) control element (CE), means for updating the timing advance value for the serving base station based on the timing advance (TA) increment media access control (MAC) control element (CE), means for transmitting a subsequent random access message to the serving base station, wherein the updated timing advance value is applied to the transmission of the subsequent random access message, means for receiving a random access response message from the serving base station in response to the transmitted random access message, wherein the random access response message includes one or more bits configured to indicate the timing advance simplification, means for receiving a random access response message from the serving base station including a back-off indicator, means for maintaining the timing advance value if a number of retransmission attempts for the random access message is less than a threshold value, means for performing a contention based random access procedure or a contention free random access procedure with the serving base station if the number of retransmission attempts for the random access message is greater than or equal to the threshold value, wherein the UE transmits a random access message of the contention based random access procedure or the contention free random access procedure without applying the timing advance value and without the request for the timing advance simplification, and means for updating the timing advance value for the serving base station based on the full size timing advance (TA) media access control (MAC) control element (CE).

In one aspect, the aforementioned means may be the processor(s) 604 shown in FIG. 6 configured to perform the functions recited by the aforementioned means. In another aspect, the aforementioned means may be a circuit or any apparatus configured to perform the functions recited by the aforementioned means.

Of course, in the above examples, the circuitry included in the processor 604 is merely provided as an example, and other means for carrying out the described functions may be included within various aspects of the present disclosure, including but not limited to the instructions stored in the computer-readable storage medium 606, or any other suitable apparatus or means described in any one of the FIGS. 1, 2, and/or 3, and utilizing, for example, the processes and/or algorithms described herein in relation to FIGS. 12-21.

The following provides an overview of aspects of the present disclosure:

Example 1: A method of wireless communication for a user equipment (UE), comprising: entering an idle state or an inactive state; and transmitting a random access message to a serving base station with a request for timing advance simplification based, at least in part, on a timing advance value corresponding to the base station, wherein the timing advance value is applied to the transmission of the random access message or a transmission of uplink small data, and wherein the random access message is an initial message of a random access procedure.

Example 2: The method example 1, further comprising: performing an initial network access procedure with the serving base station to establish a radio resource connection (RRC) with the serving base station; receiving the timing advance value for the serving base station while performing the initial network access procedure; and disabling a time alignment timer of the UE.

Example 3: The method of example 1 or 2, wherein the network access procedure enables the UE to re-establish or resume a radio resource connection (RRC), further comprising: receiving an indication of the timing advance simplification from the serving base station in response to the transmitted random access message.

Example 4: The method of any one of examples 1 through 3, wherein the timing advance value for the serving base station is associated with at least one of a cell identifier (ID) corresponding to the serving base station, an antenna panel identifier (ID) corresponding to the serving base station, and a subcarrier spacing of an initial uplink bandwidth part (BWP).

Example 5: The method of any one of examples 1 through 4, further comprising: receiving a random access response message from the serving base station in response to the transmitted random access message, wherein the random access response message is received without a timing advance (TA) media access control (MAC) control element (CE); and maintaining the timing advance value for the serving base station.

Example 6: The method of any one of examples 1 through 5, further comprising: receiving a random access response message from the serving base station in response to the transmitted random access message, wherein the random access response message is received with a timing advance (TA) increment media access control (MAC) control element (CE); updating the timing advance value for the serving base station based on the timing advance (TA) increment media access control (MAC) control element (CE); and transmitting a subsequent random access message to the serving base station, wherein the updated timing advance value is applied to the transmission of the subsequent random access message.

Example 7: The method of example 6, wherein the subsequent random access message is a physical uplink shared channel (PUSCH) transmission or a physical uplink control channel (PUCCH) transmission of a contention based random access procedure or a contention free random access procedure, wherein the PUSCH transmission or the PUCCH transmission acknowledges a successful decoding of the random access response message.

Example 8: The method of example 6, wherein the timing advance (TA) increment media access control (MAC) control element (CE) includes N bits, wherein $0 \leq N < 12$.

Example 9: The method of any one of examples 1 through 8, wherein the network access procedure enables the UE to re-establish or resume a radio resource connection (RRC), further comprising: receiving a random access response message from the serving base station in response to the transmitted random access message, wherein the random access response message includes one or more bits configured to indicate the timing advance simplification.

Example 10: The method of example 9, wherein the one or more bits are included in downlink control information (DCI) of a physical downlink control channel (PDCCH), a media access control (MAC) header of a physical downlink shared channel (PDSCH), or a MAC sub-header of the PDSCH.

Example 11: The method of any one of examples 1 through 10, further comprising: receiving a random access response message from the serving base station including a back-off indicator; maintaining the timing advance value if a number of retransmission attempts for the random access message is less than a threshold value; and performing a contention based random access procedure or a contention free random access procedure with the serving base station if the number of retransmission attempts for the random access message is greater than or equal to the threshold value, wherein the UE transmits a random access message of the contention based random access procedure or the contention free random access procedure without applying the timing advance value and without the request for the timing advance simplification.

Example 12: The method of example 11, wherein the random access response message includes a full size timing advance (TA) media access control (MAC) control element (CE), further comprising: updating the timing advance value for the serving base station based on the full size timing advance (TA) media access control (MAC) control element (CE).

Example 13: The method of any one of examples 1 through 12, wherein the UE is substantially stationary or has low mobility, and wherein the UE has one or more reduced capabilities.

Example 14: An apparatus for wireless communication, comprising: at least one processor; a transceiver communicatively coupled to the at least one processor; and a memory communicatively coupled to the at least one processor, the at least one processor and memory configured to perform a method of any one of the examples 1 through 13.

Example 15: An apparatus for wireless communication comprising at least one means for performing a method of any one of the examples 1 through 13.

Example 16: A non-transitory computer-readable medium storing computer-executable code at a user equipment (UE), the code comprising instructions executable by a processor to perform a method of any one of examples 1 through 13.

Example 17: A method of wireless communication for a base station, comprising: receiving a reduced capability report or a random access message including a request for timing advance simplification from a user equipment (UE); generating a random access response message based on the timing advance simplification; and transmitting the random access response message to the UE.

Example 18: The method of example 17, wherein the base station includes an indication of the timing advance simplification in the random access response message.

Example 19: An apparatus for wireless communication, comprising: at least one processor; a transceiver communicatively coupled to the at least one processor; and a memory communicatively coupled to the at least one processor, the at least one processor and memory configured to perform a method of example 17 or 18.

Example 20: An apparatus for wireless communication comprising at least one means for performing a method of example 17 or 18.

Example 21: A non-transitory computer-readable medium storing computer-executable code at a base station, the code comprising instructions executable by a processor to perform a method of example 17 or 18.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-22 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-22 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a user equipment (UE), comprising:
    entering an idle state or an inactive state;
    transmitting a random access message that triggers timing advance simplification to a serving base station based on a timing advance value corresponding to the serving base station, wherein the timing advance value is applied to the transmission of the random access message; and
    receiving a response message based on the timing advance simplification, wherein the response message is in response to the random access message and includes an indication of the timing advance simplification, wherein the indication indicates that the response message excludes a timing advance (TA) media access control (MAC) control element (CE), and wherein the response message is received without the TA MAC CE.

2. The method of claim 1, further comprising:
    performing a random access procedure or a small data transmission with the serving base station;
    receiving timing advance information from the serving base station to initialize the timing advance value corresponding to the serving base station; and
    disabling a time alignment timer of the UE associated with the small data transmission or the random access procedure.

3. The method of claim 2, wherein the random access procedure enables the UE to transmit an uplink message with or without a radio resource connection (RRC), re-establish the RRC, or resume the RRC, and wherein the indication includes one or more bits.

4. The method of claim 3, wherein the one or more bits are included in downlink control information (DCI) of a physical downlink control channel (PDCCH), a media access control (MAC) header of a physical downlink shared channel (PDSCH), or a MAC sub-header of the PDSCH.

5. The method of claim 1, wherein the timing advance value for the serving base station is associated with at least one of a cell identifier (ID) corresponding to the serving base station, an antenna panel identifier (ID) corresponding to the serving base station, or a subcarrier spacing of an initial uplink bandwidth part (BWP).

6. The method of claim 1, further comprising:
    maintaining the timing advance value for the serving base station.

7. The method of claim 1, wherein the response message includes a back-off indicator, the method further comprising:
    maintaining the timing advance value if a number of retransmission attempts for the random access message is less than a threshold value; and
    performing a contention based random access procedure or a contention free random access procedure with the serving base station if the number of retransmission attempts for the random access message is greater than or equal to the threshold value, wherein the UE transmits a random access message of the contention based random access procedure or the contention free random access procedure without applying the timing advance value and without a request for the timing advance simplification.

8. The method of claim 1, wherein the UE is substantially stationary or has low mobility, and wherein the UE has one or more reduced capabilities.

9. The method of claim 1, further comprising:
    applying the timing advance value to a transmission of uplink small data.

10. An apparatus for wireless communication, comprising:
    at least one processor;
    a transceiver coupled to the at least one processor; and
    a memory coupled to the at least one processor,
    wherein the at least one processor is configured to:
        enter an idle state or an inactive state;
        transmit a random access message that triggers timing advance simplification to a serving base station based on a timing advance value corresponding to the serving base station, wherein the timing advance value is applied to the transmission of the random access message; and
        receive a response message based on the timing advance simplification, wherein the response message is in response to the random access message and includes an indication of the timing advance simplification, wherein the indication indicates that the response message excludes a timing advance (TA) media access control (MAC) control element (CE), and wherein the response message is received without the TA MAC CE.

11. The apparatus of claim 10, wherein the at least one processor is further configured to:
    perform a random access procedure or a small data transmission with the serving base station;
    receive timing advance information from the serving base station to initialize the timing advance value corresponding to the serving base station; and
    disable a time alignment timer of the apparatus associated with the small data transmission or the random access procedure.

12. The apparatus of claim 11, wherein the random access procedure enables the apparatus to transmit an uplink message with or without a radio resource connection (RRC), re-establish the RRC, or resume the RRC, wherein the indication includes one or more bits.

13. The apparatus of claim 10, wherein the at least one processor is further configured to:
    maintain the timing advance value for the serving base station.

14. The apparatus of claim 10, wherein the response message includes a back-off indicator, wherein the at least one processor is further configured to:
    maintain the timing advance value if a number of retransmission attempts for the random access message is less than a threshold value; and
    perform a contention based random access procedure or a contention free random access procedure with the serving base station if the number of retransmission attempts for the random access message is greater than or equal to the threshold value, wherein the apparatus is configured to transmit a random access message of the contention based random access procedure or the contention free random access procedure without applying the timing advance value and without a request for the timing advance simplification.

15. An apparatus for wireless communication, comprising:
 means for entering an idle state or an inactive state;
 means for transmitting a random access message that triggers timing advance simplification to a serving base station based on a timing advance value corresponding to the serving base station, wherein the timing advance value is applied to the transmission of the random access message; and
 means for receiving a response message based on the timing advance simplification, wherein the response message is in response to the random access message and includes an indication of the timing advance simplification, wherein the indication indicates that the response message excludes a timing advance (TA) media access control (MAC) control element (CE), and wherein the response message is received without the TA MAC CE.

16. A non-transitory computer-readable medium storing computer-executable code, comprising code for causing a computer to:
 enter an idle state or an inactive state;
 transmit a random access message that triggers timing advance simplification to a serving base station based on a timing advance value corresponding to the serving base station, wherein the timing advance value is applied to the transmission of the random access message; and
 receive a response message based on the timing advance simplification, wherein the response message is in response to the random access message and includes an indication of the timing advance simplification, wherein the indication indicates that the response message excludes a timing advance (TA) media access control (MAC) control element (CE), and wherein the response message is received without the TA MAC CE.

17. A method of wireless communication at a base station, comprising:
 receiving a reduced capability report or a random access message that triggers timing advance simplification;
 generating a response message including an indication of the timing advance simplification, wherein the indication indicates that the response message excludes a timing advance (TA) media access control (MAC) control element (CE), and wherein the response message is generated without the TA MAC CE; and
 transmitting the response message.

18. An apparatus for wireless communication, comprising:
 at least one processor;
 a transceiver coupled to the at least one processor; and
 a memory coupled to the at least one processor,
 wherein the at least one processor is configured to:
  receive a reduced capability report or a random access message that triggers timing advance simplification;
  generate a response message including an indication of the timing advance simplification, wherein the indication indicates that the response message excludes a timing advance (TA) media access control (MAC) control element (CE), and wherein the response message is generated without the TA MAC CE; and
  transmit the response message.

19. An apparatus for wireless communication, comprising:
 means for receiving a reduced capability report or a random access message that triggers timing advance simplification;
 means for generating a response message including an indication of the timing advance simplification, wherein the indication indicates that the response message excludes a timing advance (TA) media access control (MAC) control element (CE), and wherein the response message is generated without the TA MAC CE; and
 means for transmitting the response message.

20. A non-transitory computer-readable medium storing computer-executable code, comprising code for causing a computer to:
 receive a reduced capability report or a random access message that triggers timing advance simplification;
 generate a response message including an indication of the timing advance simplification, wherein the indication indicates that the response message excludes a timing advance (TA) media access control (MAC) control element (CE), and wherein the response message is generated without the TA MAC CE; and
 transmit the response message.

21. An apparatus for wireless communication, comprising:
 at least one processor;
 a transceiver coupled to the at least one processor; and
 a memory coupled to the at least one processor,
 wherein the at least one processor is configured to:
  transmit a random access message or an uplink message to a serving base station with a request for timing advance simplification based on a timing advance value corresponding to the serving base station, wherein the timing advance value is applied to the transmission of the random access message or the uplink message, and wherein the random access message or the uplink message is transmitted with or without a radio resource connection; and
  receive a response message based on the requested timing advance simplification, wherein the response message is in response to the random access message or the uplink message and includes an indication of the timing advance simplification, wherein the indication indicates that the response message excludes a timing advance (TA) media access control (MAC) control element (CE), and wherein the response message is received without the TA MAC CE.

22. An apparatus for wireless communication, comprising:
 at least one processor;
 a transceiver coupled to the at least one processor; and
 a memory coupled to the at least one processor,
 wherein the at least one processor is configured to:
  transmit a random access message or an uplink message that triggers timing advance simplification to a serving base station based on a timing advance value corresponding to the serving base station, wherein the timing advance value is applied to the transmission of the random access message or the uplink message, and wherein the random access message or the uplink message is transmitted with or without a radio resource connection; and
  receive a response message based on the timing advance simplification, wherein the response message is received in response to the random access message or the uplink message and includes an indication of the timing advance simplification, wherein the indication indicates that the response message excludes a timing advance (TA) media access control (MAC) control element (CE), and wherein the response message is received without the TA MAC CE.

23. The apparatus of claim 22, wherein the at least one processor is further configured to:
perform a random access procedure or a small data transmission with the serving base station;
receive timing advance information from the serving base station to initialize the timing advance value corresponding to the serving base station; and
disable a time alignment timer of the apparatus associated with the small data transmission or the random access procedure.

24. The apparatus of claim 23, wherein the random access procedure enables the apparatus to transmit the uplink message with or without the radio resource connection (RRC), re-establish the RRC, or resume the RRC, wherein the indication includes one or more bits.

25. The apparatus of claim 22, wherein the at least one processor is further configured to:
maintain the timing advance value for the serving base station.

26. An apparatus for wireless communication, comprising:
at least one processor;
a transceiver coupled to the at least one processor; and
a memory coupled to the at least one processor,
wherein the at least one processor is configured to:
receive a reduced capability report or a random access message including a request for timing advance simplification; and
transmit a response message including an indication of the timing advance simplification, wherein the indication indicates that the response message excludes a timing advance (TA) media access control (MAC) control element (CE), and wherein the response message is transmitted without the TA MAC CE.

* * * * *